United States Patent
Ifill et al.

(10) Patent No.: US 11,873,114 B2
(45) Date of Patent: Jan. 16, 2024

(54) AIRFRAME-MOUNTED PACKAGE LAUNCHING SYSTEM, PACKAGE LAUNCHING DEVICE AND METHOD OF OPERATION THEREOF

(71) Applicant: AeroVironment, Inc., Arlington, VA (US)

(72) Inventors: Joel Ifill, Los Angeles, CA (US); Filip Dziwulski, Santa Monica, CA (US); Jason A Litzinger, Canyon Lake, CA (US)

(73) Assignee: AeroVironment, Inc., Arlington, VA (US)

( * ) Notice: Subject to any disclaimer, the term of this patent is extended or adjusted under 35 U.S.C. 154(b) by 620 days.

(21) Appl. No.: 17/027,663

(22) Filed: Sep. 21, 2020

(65) Prior Publication Data

US 2022/0089283 A1 Mar. 24, 2022

(51) Int. Cl.
| | |
|---|---|
| *B64D 9/00* | (2006.01) |
| *B64C 1/06* | (2006.01) |
| *B64D 1/10* | (2006.01) |
| *B64D 1/12* | (2006.01) |
| *B64C 1/14* | (2006.01) |

(52) U.S. Cl.
CPC ............ *B64D 9/00* (2013.01); *B64C 1/061* (2013.01); *B64C 1/1415* (2013.01); *B64D 1/10* (2013.01); *B64D 1/12* (2013.01); *B64D 2009/006* (2013.01)

(58) Field of Classification Search
CPC ... B64D 9/00; B64D 1/10; B64D 1/12; B64D 2009/006; B64C 1/061; B64C 1/1415
See application file for complete search history.

(56) References Cited

U.S. PATENT DOCUMENTS

| 5,927,648 A | 7/1999 | Woodland |
|---|---|---|
| 7,395,761 B2 | 7/2008 | Bittle |
| | (Continued) | |

FOREIGN PATENT DOCUMENTS

| WO | WO-2009051711 A1 * | 4/2009 | ........... B64C 1/1407 |
|---|---|---|---|
| WO | WO-2019168643 A1 * | 9/2019 | ............... B64D 1/06 |

*Primary Examiner* — Assres H Woldemaryam
(74) *Attorney, Agent, or Firm* — Donald J. Lecher; BUTZEL LONG

(57) ABSTRACT

An airframe-mounted package launching system including a package launching device mounted in an interior portion of an airframe structure proximate an external airframe opening, the package launching device including a launch bed configured to support a package during a launching process, and a launch assembly configured to impart a launching force to the supported package on the launch bed during the launching process. The launch assembly includes a launch carriage configured to translate under an applied force from a first locked position toward a second stopped position during the launching process, and a trigger assembly configured to hold the launch carriage in the first locked position, release the launch carriage from the first locked position when the trigger assembly receives a trigger input thereby initiating the launching process, retrieve the launch carriage from the second stopped position during a retrieval process, and translate, during the retrieval process, the launch carriage against the applied force into the first locked position.

31 Claims, 25 Drawing Sheets

(56) References Cited

U.S. PATENT DOCUMENTS

| | | | |
|---|---|---|---|
| 7,726,604 B1* | 6/2010 | Smith | B64C 1/1415 |
| | | | 244/129.1 |
| 7,735,781 B1 | 6/2010 | Moritz | |
| 7,845,595 B2 | 12/2010 | Goddard | |
| 8,480,034 B2 | 7/2013 | Goddard et al. | |
| 8,480,035 B2 | 7/2013 | Goddard et al. | |
| 8,979,029 B2 | 3/2015 | Jaurand et al. | |
| 8,985,519 B2 | 3/2015 | Jaurand | |
| 10,994,842 B1* | 5/2021 | Skylus | B64U 50/12 |
| 2005/0077429 A1 | 4/2005 | Beauchamp | |
| 2020/0363155 A1* | 11/2020 | Bies | B64D 7/08 |
| 2021/0309370 A1* | 10/2021 | Kooiman | E05F 15/605 |

* cited by examiner

AIRFRAME-MOUNTED PACKAGE LAUNCHING SYSTEM, PACKAGE LAUNCHING DEVICE AND METHOD OF OPERATION THEREOF

BACKGROUND

The present disclosure generally relates to the aerial delivery of goods from an aircraft, for example, an airplane, helicopter or other aerial vehicle, to an intended ground or water-based target location. The aerial delivery package may additionally be a guided aerial delivery package fitted with an autonomous package guidance system. The present disclosure relates to a system, device and method for launching an aerial delivery package to thereby provide accurate package deliveries to the intended ground or water-based target location regardless of external atmospheric or ground conditions.

Airdrop systems have been in use for many decades to perform delivery from various types of aircraft. In its simplest form, a package is dropped from a moving aircraft such that forward momentum carries the package toward its intended ground location target. This solution has long been used to provide humanitarian aid in areas plagued by famine, natural disasters or war, supplying military troops with provisions or deploying life-saving systems to occupants of marine vessels in distress.

Air drops have need to deliver goods as close as possible to the land-based user in order to reduce secondary transit modes such as vehicular or hand delivery, and may take place in congested locations where buildings, persons or vehicles may be present in the vicinity of air drop operations. Therefore, it is important that air dropped packages land within designed target landing sites.

A need exists for a package launching system, device and method configured for use with an aircraft to reliably repeat a launch process of aerial delivered packages, whether or not they are equipped with an autonomous package guidance system, at a precise time and location as determined by aircraft location and instrumentation indicators, to ensure the accurate delivery of the aerial delivered package to its intended ground-based target location.

BRIEF SUMMARY

According to one configuration of the disclosed subject matter, an airframe-mounted package launching system includes an airframe structure of an aircraft, including an external airframe opening, and a package launching device mounted in an interior portion of the airframe structure proximate the external airframe opening. The package launching device further includes a launch bed configured to support a package during a launching process, and a launch assembly configured to impart a launching force to the supported package on the launch bed during the launching process. The launch assembly includes a launch carriage configured to translate under an applied force from a first locked position toward a second stopped position during the launching process, and a trigger assembly. The trigger assembly is further configured to hold the launch carriage in the first locked position, release the launch carriage from the first locked position when the trigger assembly receives a trigger input thereby initiating the launching process, retrieve the launch carriage from the second stopped position during a retrieval process, and translate, during the retrieval process, the launch carriage against the applied force into the first locked position.

According to another configuration of the disclosed subject matter, a package launching device configured to be attached to an aircraft airframe structure proximate an external airframe opening includes a launch bed configured to support a package during a launching process, and a launch assembly configured to impart a launching force to the supported package on the launch bed during the launching process. The launch assembly further includes a launch carriage configured to translate under an applied force from a first locked position toward a second stopped position during the launching process, and a trigger assembly. The trigger assembly is further configured to hold the launch carriage in the first locked position, release the launch carriage from the first locked position when the trigger assembly receives a trigger input thereby initiating the launching process, retrieve the launch carriage from the second stopped position during a retrieval process, and translate, during the retrieval process, the launch carriage against the applied force into the first locked position.

According to another configuration of the disclosed subject matter, a method of operating an airframe package launching system includes mounting a package launching device to an airframe structure of an aircraft, providing a trigger input to the package launching device configured to activate a launching process to launch a package from the package launching device through an external airframe opening of the aircraft, and initiating a resetting process of the package launching device configured to enable another package to be subject to a second launching process.

Additional features, advantages, and configurations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in, and constitute a part of this specification. The drawings also illustrate embodiments of the disclosed subject matter and together with the detailed description explain the principles of embodiments of the disclosed subject matter. No attempt is made to show structural details in more detail than may be necessary for a fundamental understanding of the disclosed subject matter and various ways in which it may be practiced.

FIGS. 3-14 depict a sequential assembly build-up illustration of the package launching device.

FIG. 3 illustrates a motor carriage assembly of the airframe-mounted package launching device.

FIG. 4 illustrates the motor carriage assembly of FIG. 3 with a trigger assembly.

FIG. 5A illustrates the trigger assembly of FIG. 4 from a rear perspective view, and FIG. 5B illustrates the trigger assembly of FIG. 4 from a front perspective view.

FIG. 6 illustrates the motor carriage assembly with the trigger assembly and a launch assembly.

FIG. 7A illustrates the launch assembly of FIG. 6 from a rear perspective view, and FIG. 7B illustrates the launch assembly of FIG. 6 from a front perspective view.

FIG. 8A illustrates the trigger and launch assemblies of FIGS. 5A and 7A from a rear perspective view, and FIG. 8B illustrates the trigger assemblies of FIGS. 5B and 7B from a front perspective view.

FIG. 9 illustrates the motor carriage assembly with lower frame members.

FIG. 10 illustrates the motor carriage assembly, the lower frame members and a pulley assembly connected to the lower frame members and the launch assembly.

FIG. 11 illustrates the motor carriage assembly, the lower frame members, the pulley assembly and a torsional spring assembly connected to the lower frame members, the pulley assembly and forward pillow block mounts connected to a partial representation of an interior horizontal floor member of an airframe, and rearward pillow block mounts connected to the interior horizontal floor member and a lower frame member.

FIG. 12 illustrates the motor carriage assembly, the lower frame members, the pulley assembly the torsional spring assembly of FIG. 11 connected to middle frame members, and a top-mounted pusher attached to the launch assembly.

FIG. 13 illustrates the motor carriage assembly, the lower frame members, the pulley assembly the torsional spring assembly connected to middle frame members, and the top-mounted pusher of FIG. 12 and a launcher table.

FIG. 14 illustrates the motor carriage assembly, the lower frame members, the pulley assembly the torsional spring assembly connected to middle frame members, the top-mounted pusher and the launcher table of FIG. 13 with lower table panels, and opposing table fences with roller assemblies connected to upper frame members.

FIG. 15 illustrates an initial locked launch position of the motor carriage assembly.

FIG. 16 illustrates the launching process where the released launch carriage is at a mid-point of travel.

FIG. 17 illustrates the completion of the launching process where the launch carriage is at an endpoint of travel.

FIG. 18 illustrates the retrieval process where the trigger slide assembly is at a mid-point of travel.

FIG. 19 illustrates the retrieval process where the trigger slide assembly is at the endpoint of travel and engages the launch carriage.

FIG. 20 illustrates the retrieval process where the trigger slide assembly and the engaged launch carriage are at a mid-point of travel.

FIG. 21 illustrates the completion of the retrieval process where the trigger slide assembly and the engaged launch carriage return and are held at the initial locked launch position.

DETAILED DESCRIPTION

Figure 1:
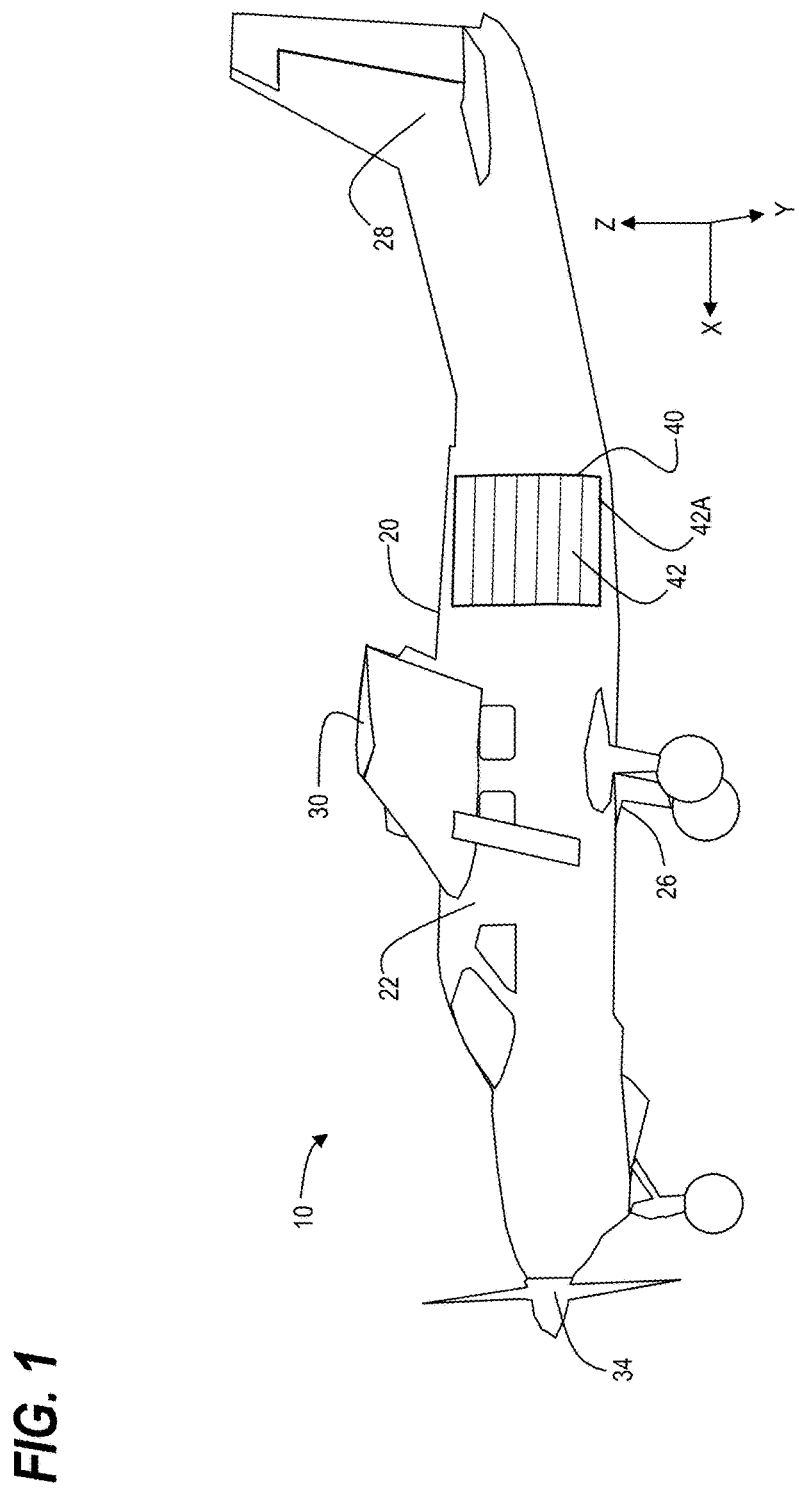
FIG. 1 depicts an aircraft with an exterior door suitable for aerial delivered packages.

FIG. 1 depicts an aircraft 10 with an exterior airframe-mounted door 42 suitable for launching aerial delivered packages. The aircraft 10 may include any type of aircraft suitable for aerial delivered packages, including but not limited to, fixed wing aircraft 10, (as shown in FIGS. 1 and 2), helicopters, and airships (not shown).

The aircraft 10 of FIG. 1 includes an airframe 20 that supports a fuselage 22 having an interior airframe space 24, or cabin, (see FIG. 2), an undercarriage 26 supporting landing gear or equivalent landing devices, an empennage 28 with control surfaces, and wings 30 with control surfaces. The aircraft 10 of FIG. 1 also illustrates a front-mounted propeller-type propulsion system 34 that is representative of any other type of propulsion system suitable for aircraft flight.

Figure 2:
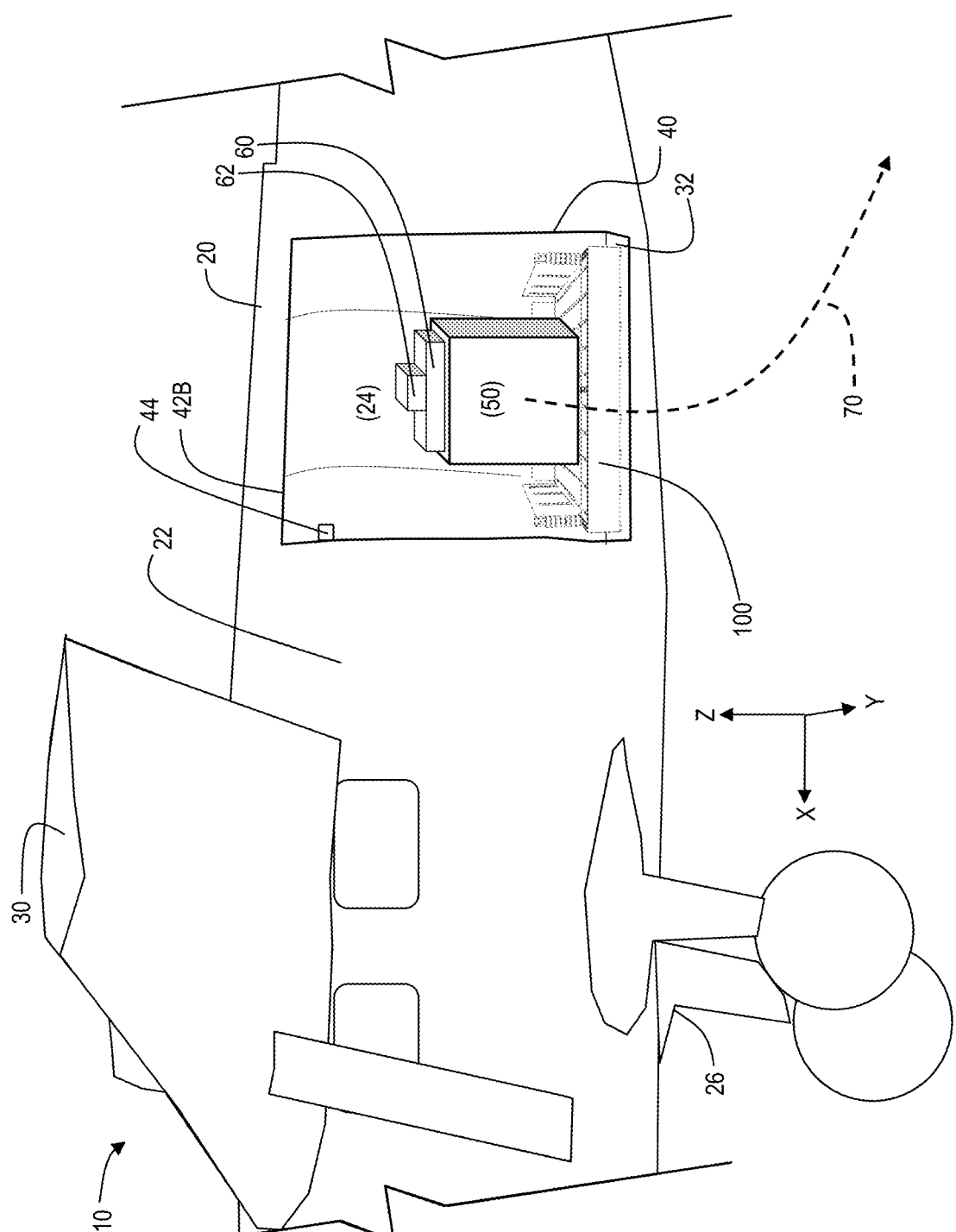
FIG. 2 depicts the aircraft of FIG. 1 with the exterior door in a retracted position and an aerial delivery package placed on an airframe-mounted package launching device.

The airframe 20 of the aircraft 10 represented in FIG. 1 also includes an external airframe opening 40 configured to accept an airframe door 42 mounted thereto, and capable of moving between a closed-door position 42A, (see FIG. 1), to an open-door position 42B, (see FIG. 2). In the illustration of the aircraft 10 of FIG. 1, the airframe door 42 is represented by a segmented roll-up door typically used for skydiving. Other airframe doors may be used to allow pressurization of the interior airframe space 24 at certain flight altitudes.

Note also regarding FIG. 1, the coordinate axes illustration used throughout the drawings in this disclosure depict direction "X" being the forward direction of flight of the aircraft 10, direction "Y" being a direction orthogonal to the forward direction of flight of the aircraft 10 and substantially parallel to an initial trajectory direction of an aerial delivered package launched from the aircraft 10 through the external airframe opening 40, and "Z" being a direction orthogonal to a plane of defined by "X" and "Y" and substantially parallel to an initial loading direction of an aerial delivered package loaded onto the package launching device 100, (see FIG. 2), as disclosed below.

FIG. 2 depicts the aircraft 10 of FIG. 1 with the exterior door 40 in a retracted open-door position 42B and an aerial delivery package 50 placed on an airframe-mounted package launching device 100 attached to an interior horizontal member 32 of the airframe 20.

The airframe 20 additionally includes an attached door status sensor 44 that transmits a door status sensor signal 44', (see FIG. 22), to a package launch system controller 700, (see FIG. 22), or to an alert indicator configured to gain the attention the operator of the aircraft 10 when the door status sensor 44 determines the airframe door 42 is in an open-door position 42B as represented in FIG. 2. An airframe door actuator 46, (see FIG. 22), is configured to move the airframe door 42 between the closed-door position 42A, (see FIG. 1), and the open-door position 42B.

The aerial package 50 may be placed on the package launching device 100 such that when the package launching device 100 initiates a package launch process, the aerial delivery package 50 may be translated across the package launching device 100 in the "Y" direction and through the external airframe opening 40 when the aircraft 10 has reached a location determined to cause the aerial delivery package 50 to reach its intended ground or water-based target location.

Aerial delivery package 50 may additionally include an autonomous package guidance system 60, (including an integrated package telemetry pod 62 for communication with a package launching controller in the aircraft, later discussed), configured to deploy separate control surfaces configured to guide the aerial delivery package 50 to its intended ground or water-based target location. After being launched from the package launching device 100, the aerial delivery package 50 substantially follows the package ejection trajectory 70 after it has passed through the external airframe opening 40 as it moves to its intended ground or water-based target location.

FIGS. 3-14 depict sequential assembly build-up illustrations of the package launching device 100.

Figure 3:
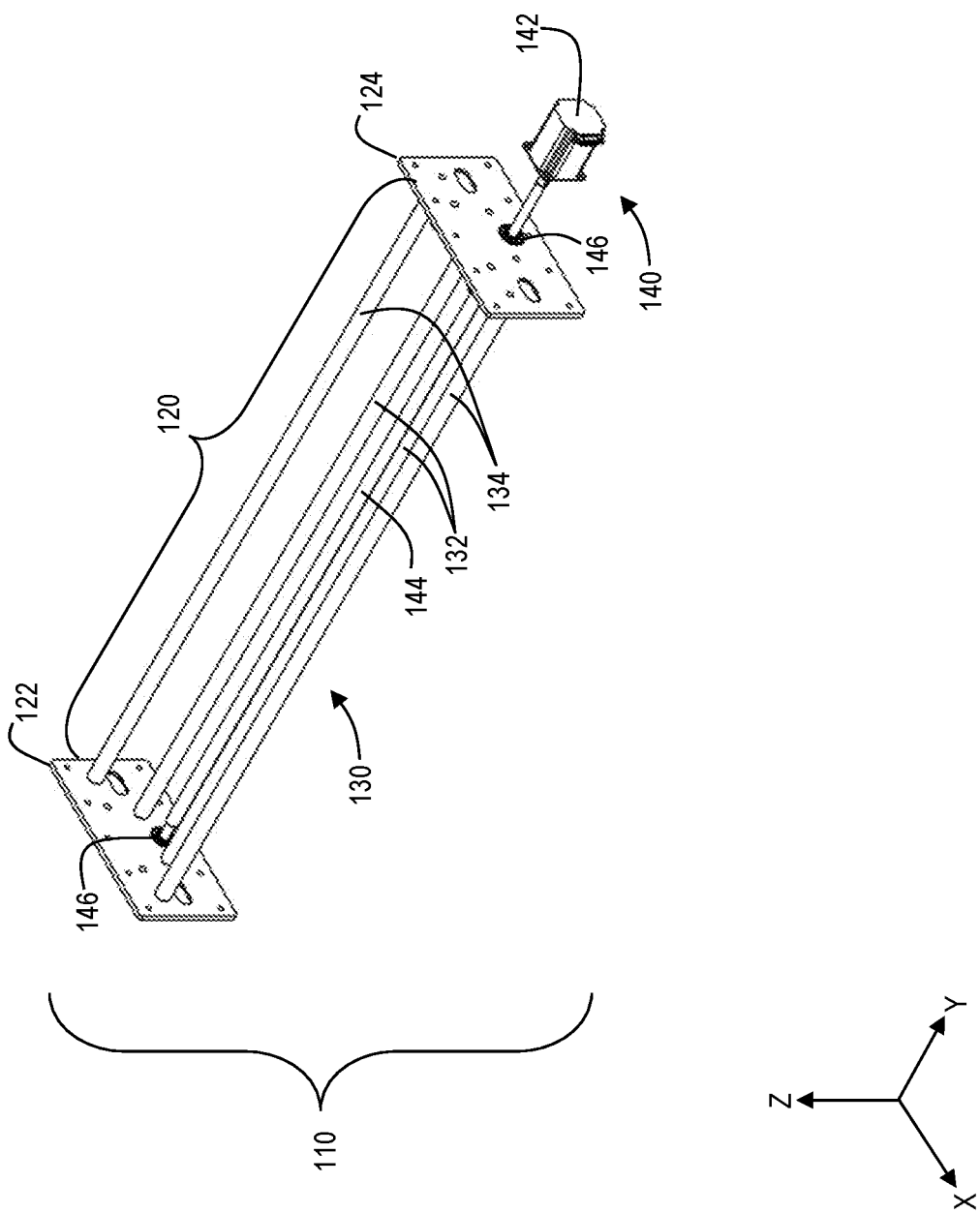

FIG. 3 illustrates a motor carriage assembly 110 of the airframe-mounted package launching device 100 that includes opposing carriage plates 120 having a rear carriage plate 122 and a forward carriage plate 124. (The terms "rear" and "forward" relate to the "Y" direction, where "forward" defines the forward motion of the package launching device 100 during the package launching process.) The forward carriage plate 124 further includes forward carriage plate bumpers 126, (illustrated in FIG. 20), that absorb the energy of the translating launch carriage 180, (see FIGS. 6-7B), later described.

The motor carriage assembly 110 further includes two pairs of traveler shafts 130 connected between the rear carriage plate 122 and the forward carriage plate 124. These traveler shafts 130 include a trigger assembly traveler shaft pair 132 configured to support a translating motion to the trigger assembly 150, (see FIG. 4), and a launch assembly traveler shaft pair 134 configured to support a translating motion to the launch assembly 180, (see FIG. 6).

The motor carriage assembly 110 further includes a trigger assembly position controller 140 having a position control motor 142 connected to a distal end of a worm gear 144 that is supported by respective worm gear bushings 146 in the rear carriage plate 122 and the forward carriage plate 124.

Figure 4:
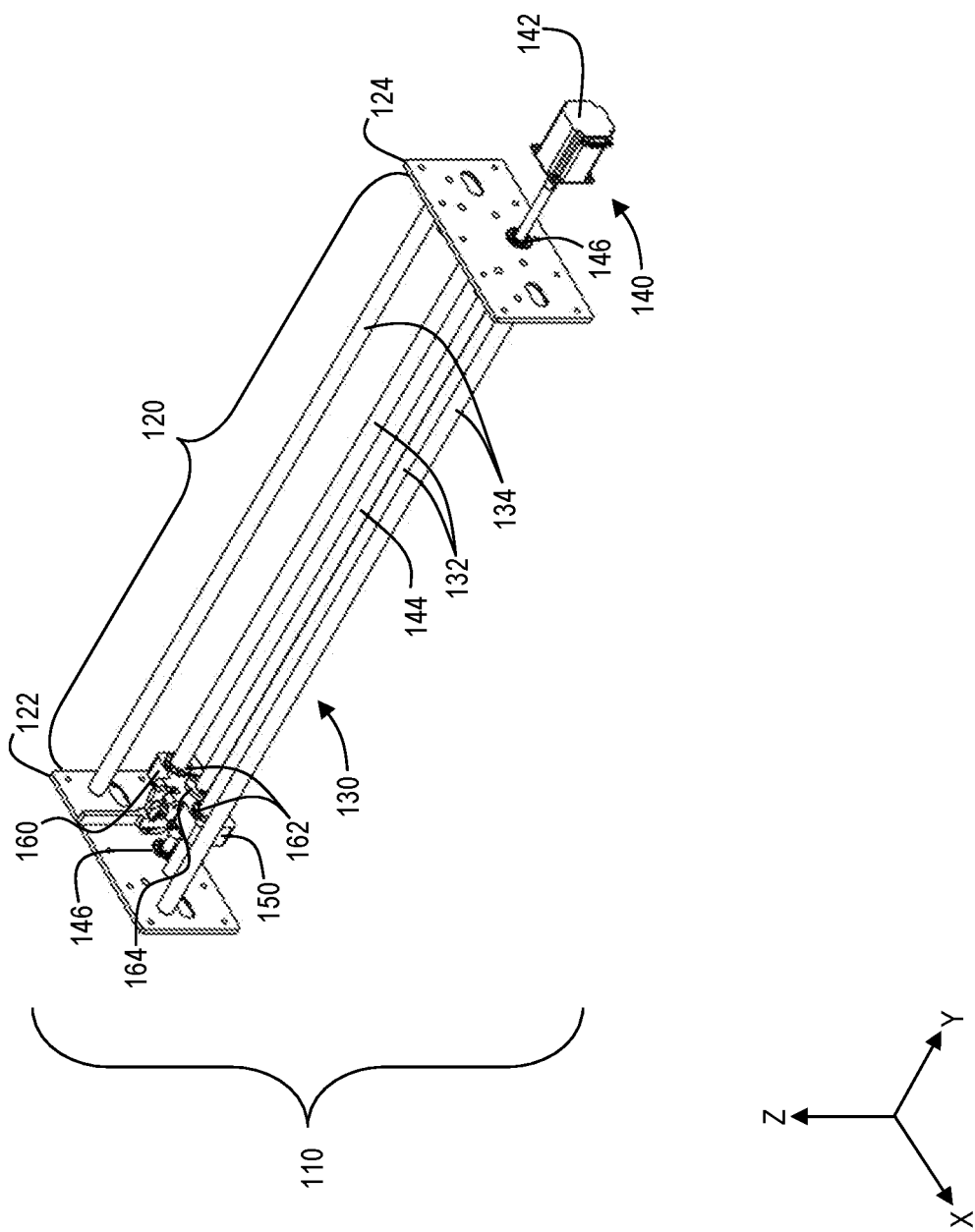
Figure 5B:
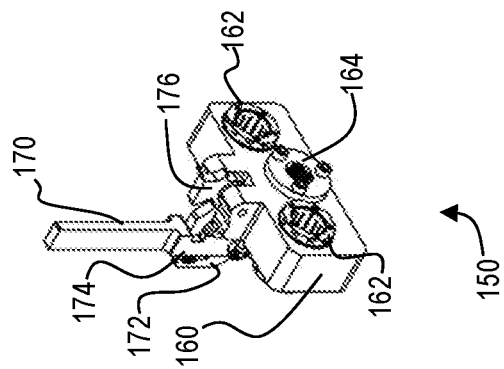
FIGS. 5A and 5B illustrate details of the trigger assembly of FIG. 4 apart from the motor carriage assembly.
Figure 5A:
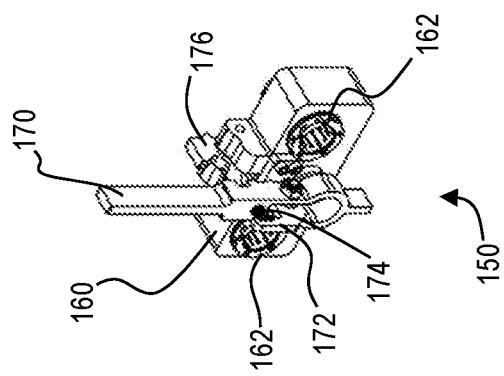

FIG. 4 illustrates the motor carriage assembly 110 of FIG. 3 with a trigger assembly 150 mounted on the pair of trigger assembly traveler shafts 132. FIGS. 5A and 5B illustrate details of the trigger assembly 150 of FIG. 4 apart from the motor carriage assembly 110. The trigger assembly 150 includes a slide block 160 having a pair of linear bearings 162 that interface with the corresponding pair of trigger assembly traveler shafts 132, and a worm gear bearing 164 that interfaces with the worm gear 144 of the trigger assembly position controller 140.

The trigger assembly 150 further includes a trigger lever 170 connected in a rotatable manner to a clevis 172 fixedly attached to the slide block 160. A spring 174 is positioned between the clevis 172 and the slide block 160 to bias the trigger level 170 to engage a latch 176 connected in a rotatable manner to the slide block 160.

Figure 6:
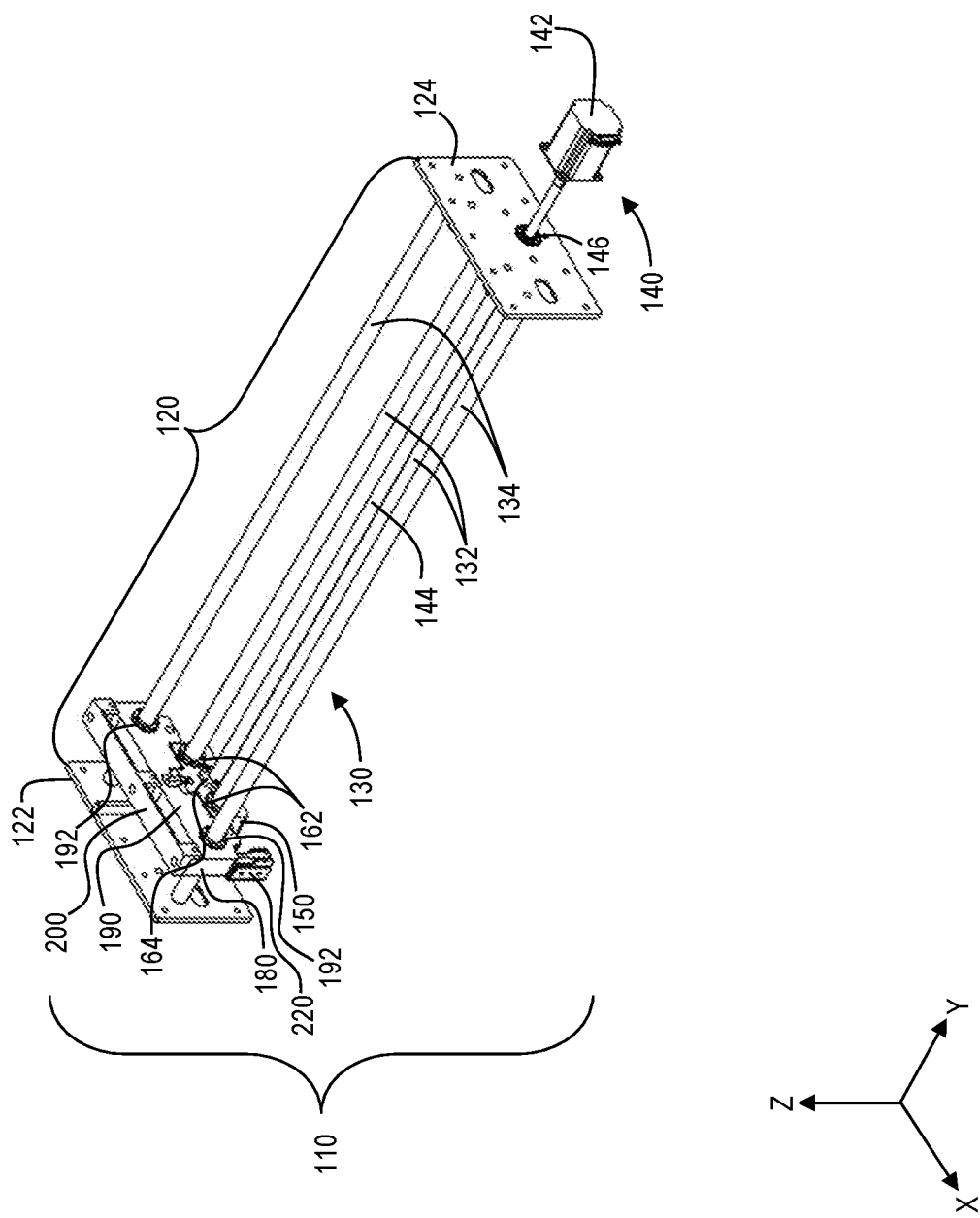
Figure 7B:
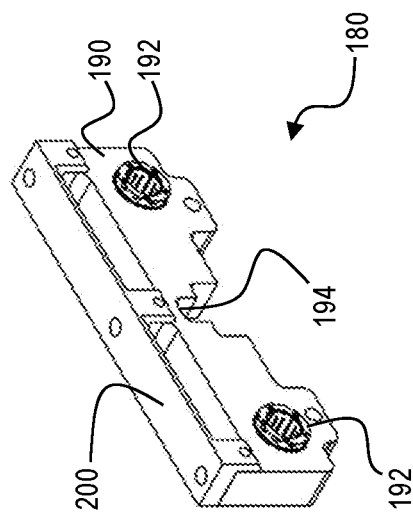
FIGS. 7A and 7B illustrate details of the launch assembly of FIG. 6 apart from the motor carriage and trigger assemblies.
Figure 7A:
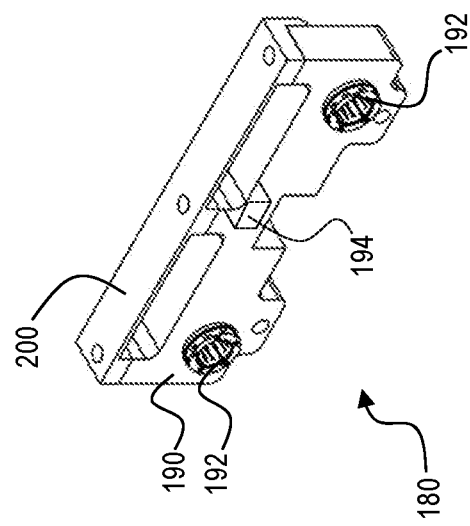

FIG. 6 illustrates the motor carriage assembly 110 with the trigger assembly 150 and a launch assembly 180 connected to the respective pair of launch assembly traveler shafts 134. FIGS. 7A and 7B illustrate details of the launch assembly 180 of FIG. 6 apart from the motor carriage assembly 110, the trigger assembly position controller 140 and the trigger assembly 150. The launch assembly 180 further includes a launch carriage 190 having respective linear bushings 192 that interface with the corresponding pair of launch assembly traveler shafts 134, and a latch catch recess 194 configured to interface with latch 176 of the trigger assembly 150.

Launch assembly 180 is further connected to a launch table connector plate 200 mounted above an upper surface of a launcher table 430, (see FIG. 13), and further connected to a top mounted pusher 210 (see FIG. 11) configured to push an aerial delivery package across the package launching device 100.

Figure 8B:
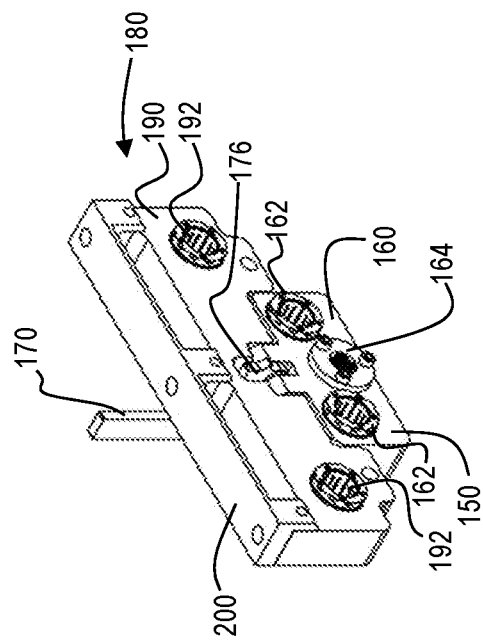
FIGS. 8A and 8B illustrate details of the trigger assembly of FIGS. 5A and 5B oriented with respect to the launch assembly of FIGS. 7A and 7B, apart from the motor carriage assembly.
Figure 8A:
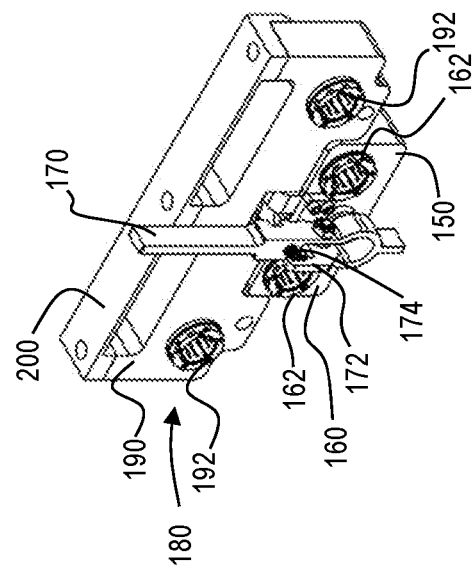

FIGS. 8A and 8B illustrate details of the trigger assembly 150 of FIGS. 5A and 5B oriented with respect to the launch assembly 180 of FIGS. 7A and 7B, apart from the motor carriage assembly 100. In these illustrations, the latch 176 of the trigger assembly is connected to the latch catch recess 194 of the launch assembly 180.

FIG. 6 further illustrates a launch carriage position sensor 220 configured to engage a portion of the launch carriage 190 two indicate whether the motor carriage assembly 110 is in an initial locked position as described further below. The launch carriage position sensor 220 may provide a signal 220', (see FIG. 22), indicating the status of the motor carriage assembly 110 in relationship to an initial locked position.

Figure 9:
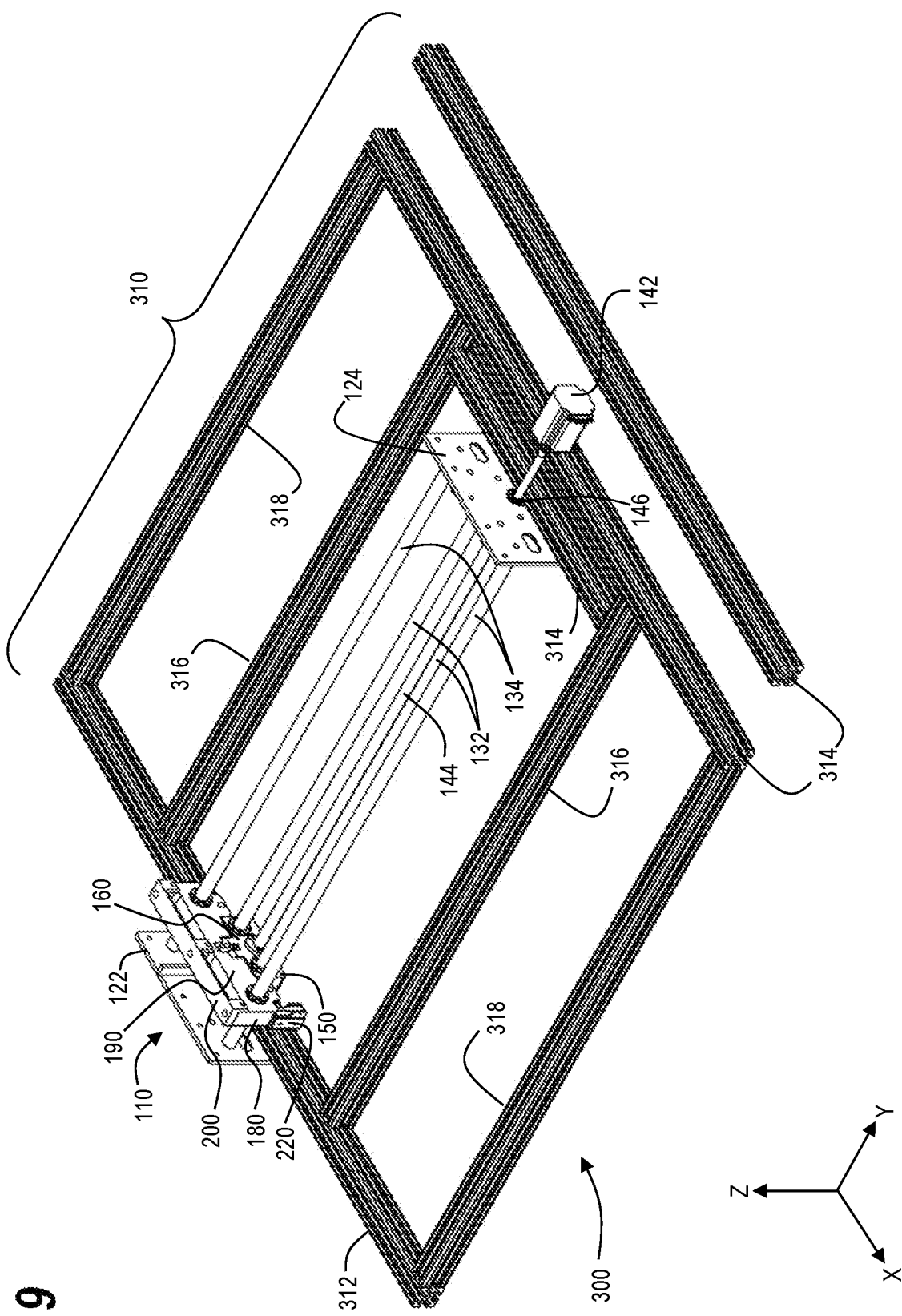

FIG. 9 illustrates the motor carriage assembly 110 connected with lower frame members 310 of a frame 300. Particularly, a rearward transverse member 312 is connected to the rear carriage plate 122 of the motor carriage assembly 110, and a forward transverse member 314 is connected to the forward carriage plate 124 of the motor carriage assembly 110. Interior linear members 316 and exterior members 318 are connected to rearward transverse member 312 and forward transverse members 314.

Figure 10:
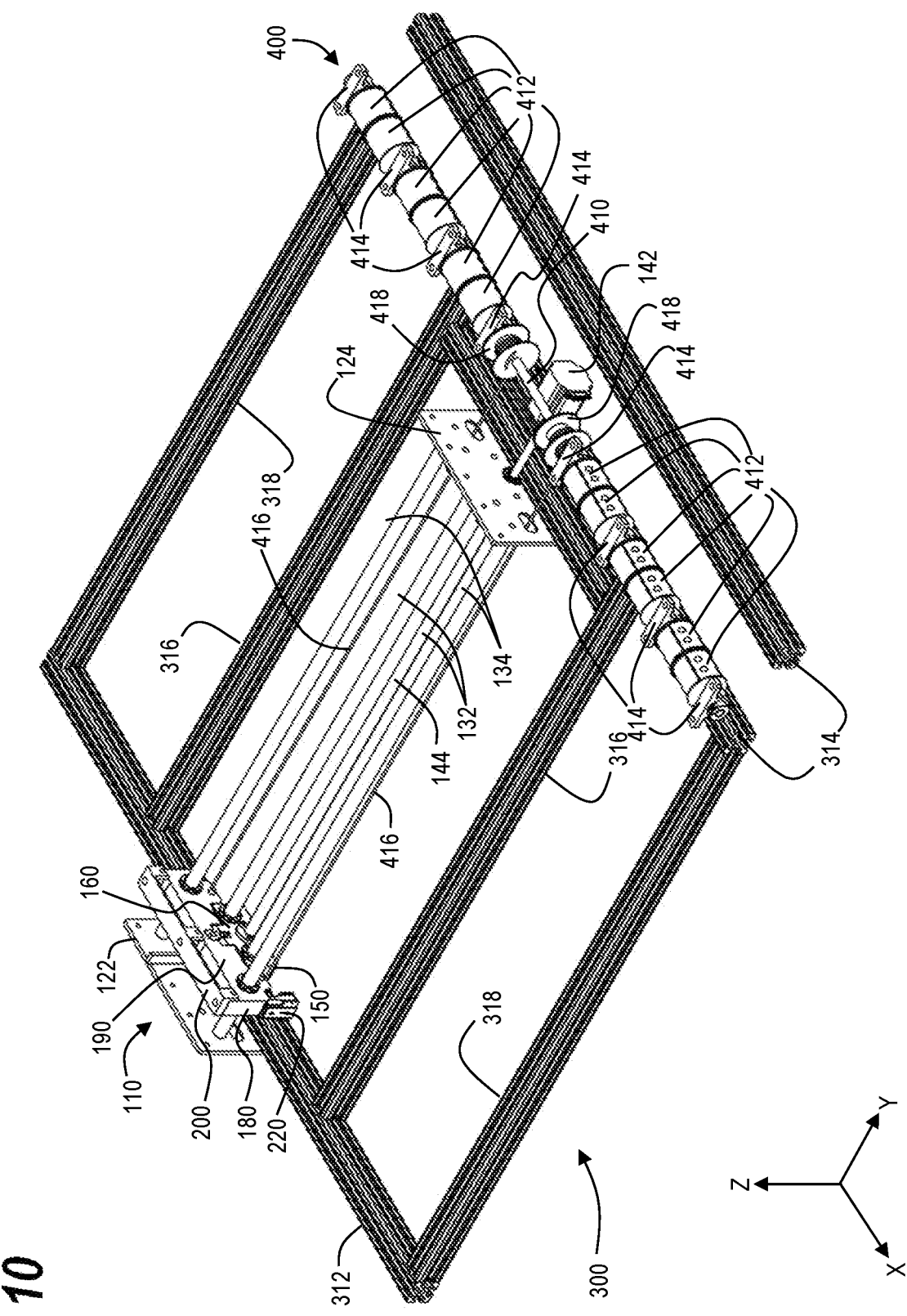

FIG. 10 illustrates the motor carriage assembly 110, the lower frame members 310 and a pulley assembly 400 connected to the lower frame members 310 and the launch assembly 180. The pulley assembly 400 includes a pulley axle 410 about which include spring mounting spindles 412, mounting bearings 414 and tension wires 416 connected to tension wire take-up spools 418. The opposite distal end of tension wires 416 are connected to the launch carriage 190 of launch assembly 180 through two apertures in the forward carriage plate 124. Mounting bearings 414 secure the pulley axle 410 to middle frame members 330 shown in FIG. 12.

Figure 11:
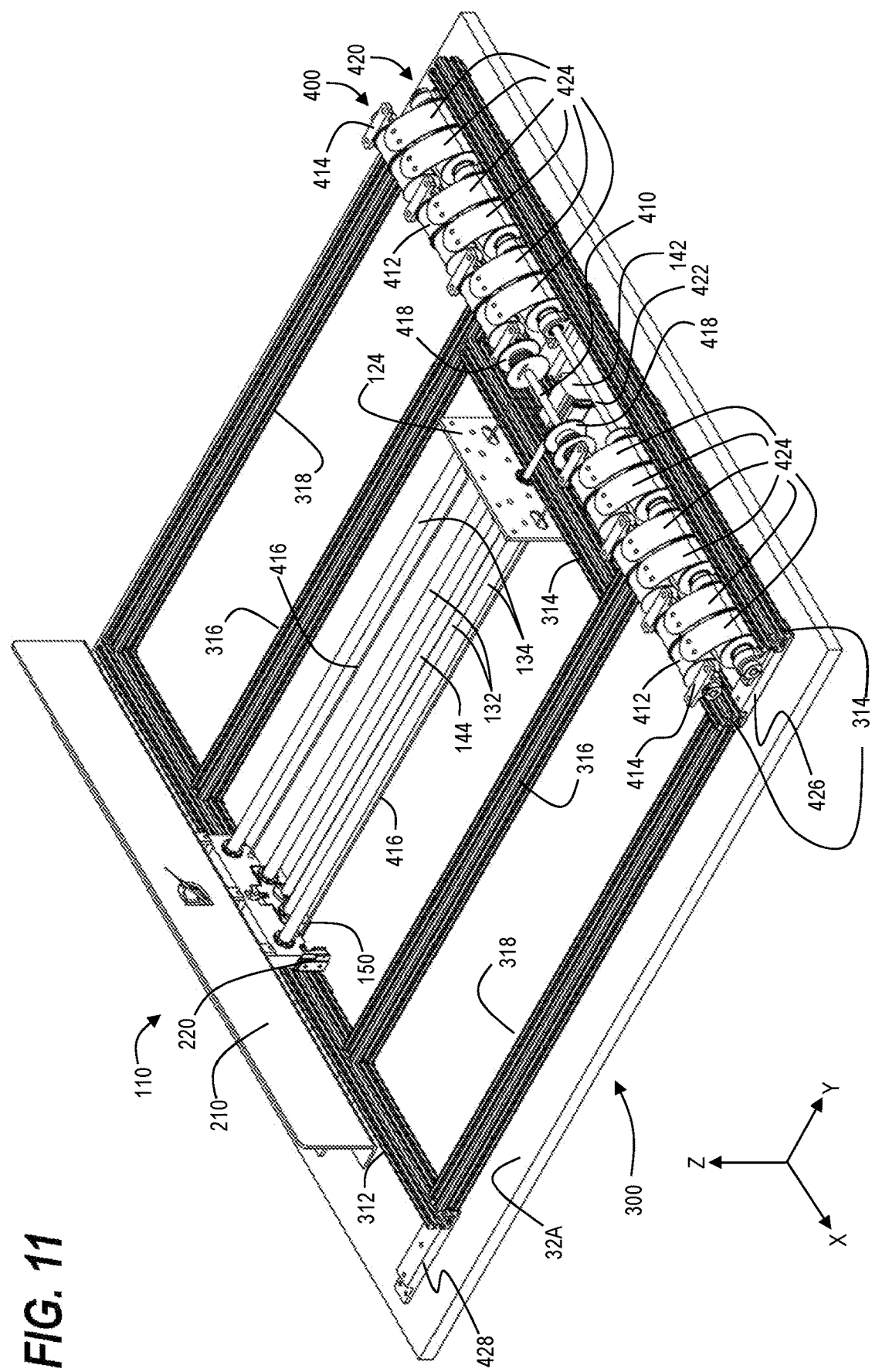

FIG. 11 illustrates the motor carriage assembly 110, the lower frame members 310, the pulley assembly 400 and a torsional spring 420 assembly connected to the lower frame members 310, the pulley assembly 400 and forward pillow block mounts 426 connected to a partial representation of an interior horizontal floor member 32A of an airframe 20, (see FIG. 2), and rearward pillow block mounts 428 are connected to the interior horizontal floor member 32A and the rearward transverse frame member 312.

The torsional spring 420 further includes torsional spring axle 422 and torsional spring assemblies 424 connected at one end to corresponding spring mounting spindles 412. The sum of the force supplied by torsional spring assemblies 424 provide a rotational force to the pulley assembly 400 when the motor carriage assembly 110 is translated away from the forward carriage plate 124 toward the rear carriage plate 122 causing the torsional spring assemblies 424 to unwind from their stored positions around the torsional spring axle 422 and to be wound around the corresponding spring mounting spindles 412 on the pulley axel 410 of the pulley assembly 400.

Alternatives to the combination of the torsional spring, the pulley assembly and the motor carriage assembly may include other linear actuators that may impart a driving force to the top mounted pusher 210 to launch an aerial deliver package 50. Alternative linear-based actuators may include a pneumatic actuator, a hydraulic actuator, a linear motor, or other types of applied spring energy.

Figure 12:
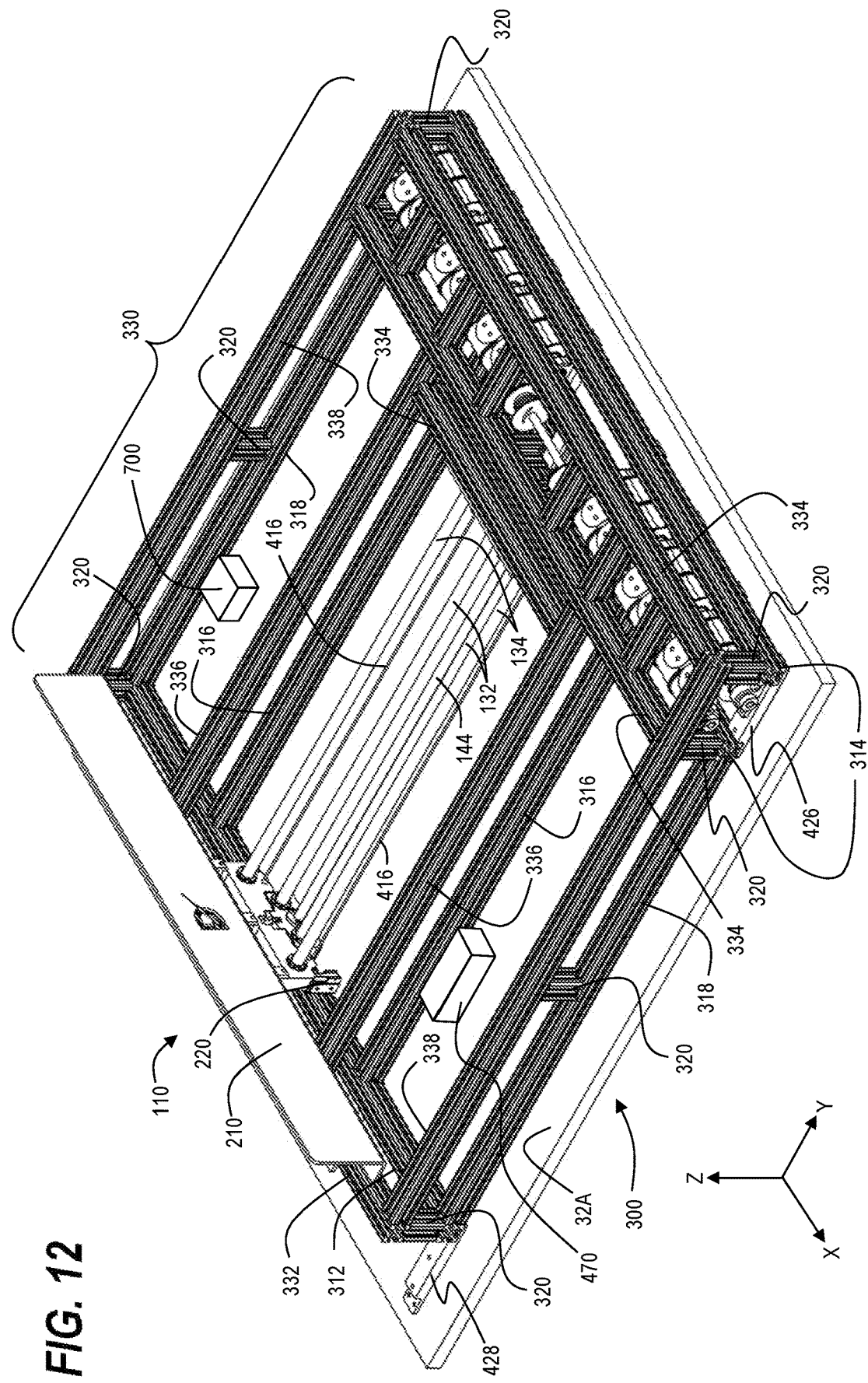

FIG. 12 illustrates the motor carriage assembly 110, the lower frame members 310, the pulley assembly 400, and the torsional spring assembly 420 of FIG. 11 connected to middle frame members 330, and a top-mounted pusher 210 attached to the launch assembly 180. The frame 300 as shown in FIG. 12 further includes lower vertical frame members 320 connecting the lower frame members 310 to the middle frame members 330 including a mid-rearward transverse member 332, mid-forward transverse members 334, mid-interior linear members 336 and mid-exterior linear members 338.

FIG. 12 further illustrates a rechargeable battery 470 attached to a representative frame member 316 to provide power to a package launch system controller 700 that may control operation of the package launching device 100 and its various sensors, (described in more detail in FIG. 22), and in an alternative to the mechanical torsional spring assembly 420, the battery 470 may supply power to an electrically operated linear actuator, for example, a linear motor actuator or other type of electrically operated actuators configured to supply a force to the top mounted pusher 210 to launch an aerial deliver package 50.

Figure 13:
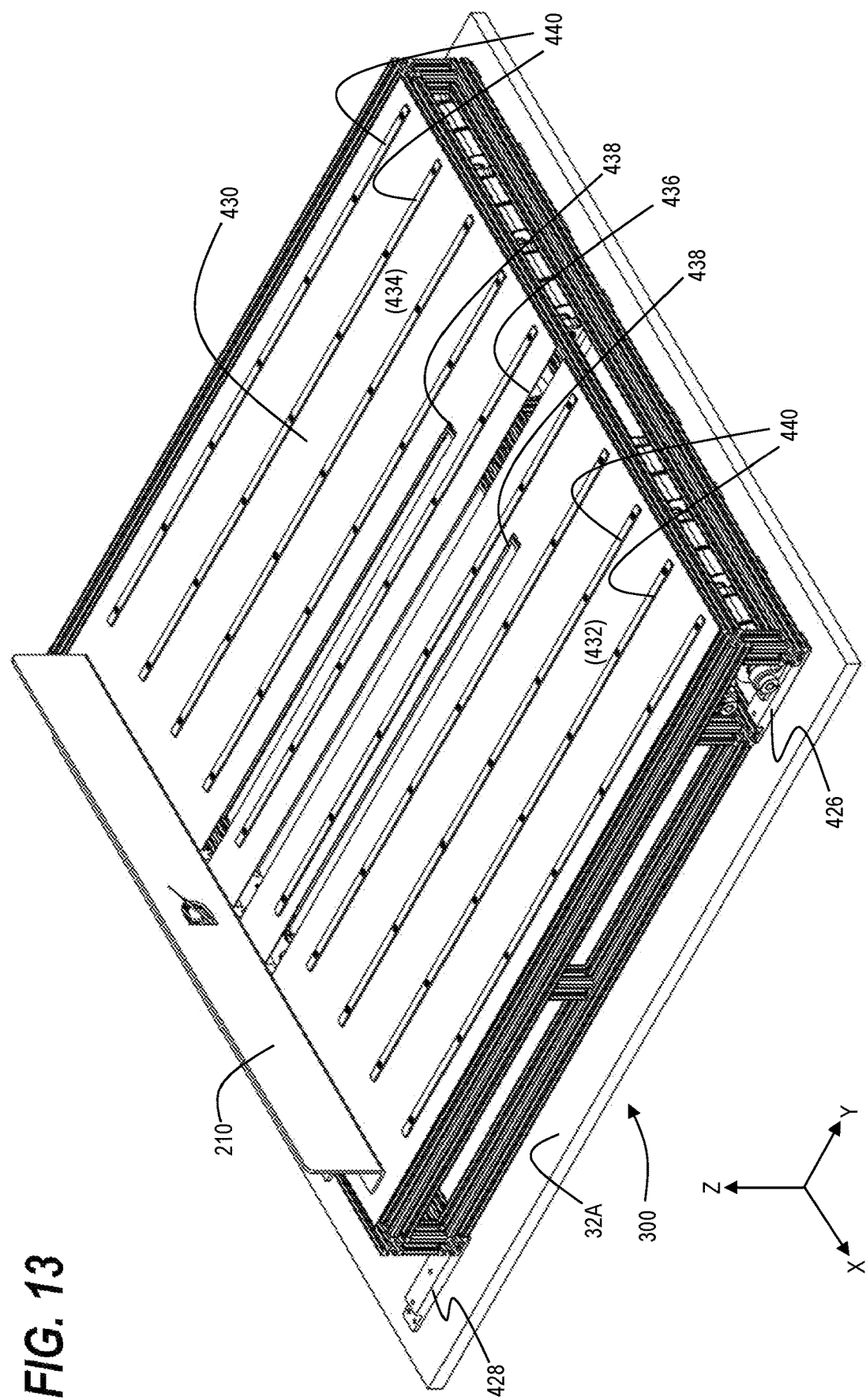

FIG. 13 illustrates the motor carriage assembly 110, the lower frame members 310, the pulley assembly 400, the torsional spring assembly 420 connected to middle frame members 330, and the top-mounted pusher 210 of FIG. 12 and a launcher table 430. Note the launch table connector plate 200, connected to the launch carriage 190 of the launch assembly 180, protrudes above the launcher table 430 such that the top-mounted pusher 210 may traverse across the top surface of the launcher table 430.

The launcher table 430 includes a left-side table 432, and a right-side table 434 that defines a center slot 436 in the launcher table 430. Side slots 438 are located in each of the left-side 432 and right-side 434 tables proximate the center slot 436 to allow the launch table connector plate 200 to protrude through each of the slots 432, 434 and 436. One chair table 430 further includes a plurality of linear surface bearings 440 to provide a low friction surface interface for aerial delivery packages (50) placed on the launcher table 430.

Figure 14:
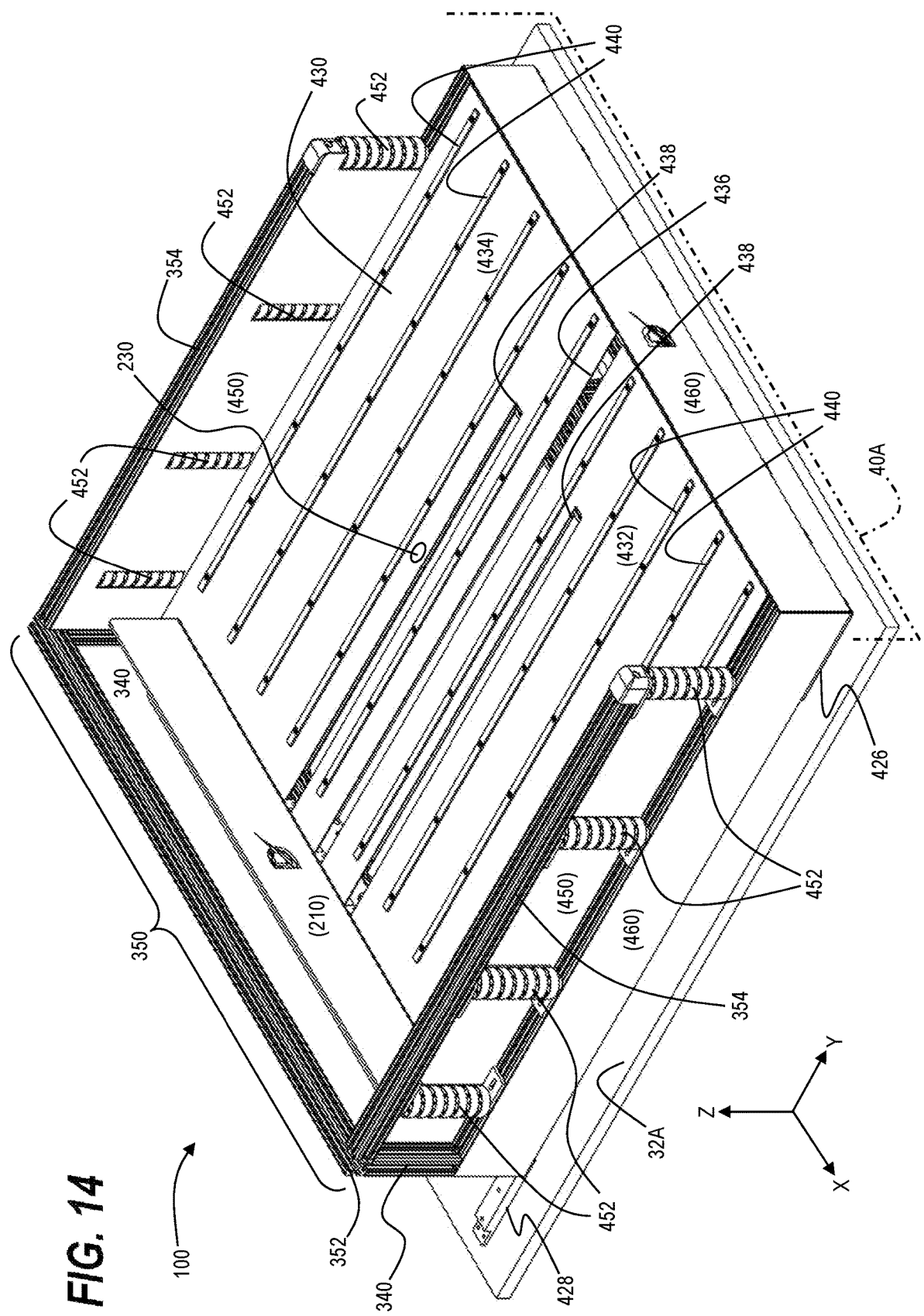

FIG. 14 illustrates the complete package launching device 100 including the motor carriage assembly 110, the lower frame members 310, the pulley assembly 400, the torsional spring assembly 420 connected to middle frame members 330, the top-mounted pusher 210 and the launcher table 430 of FIG. 13 with lower table panels 460, and opposing table fences 450 with roller assemblies 452 connected to upper frame members 350. The upper frame members 350 includes an upper-rearward transverse member 352 and an upper-linear fence member 354 connected by middle vertical frame members 340 to the middle frame and members 330.

The roller assemblies 452 further provide low frictional contact points on the opposing table fences 450 when an aerial delivery package (50) placed on the launcher table 430 abuts either of the opposing table fences 450.

The package launching device 100 may further include a launch bed package sensor 230 placed proximate the launcher table 430 to sense whether an aerial delivery package and/or which aerial delivery particular package is placed on the launcher table 430. Accordingly, the launch bed package sensor 230 may generate and transmit a launch bed package sensor signal 230', (see FIG. 22), to a package launching controller or for a corresponding indication to an operator. The launch bed package sensor 230 may include any type of sensor to determine if an object has been loaded on the launcher table 430, for example, a weight sensor, a light beam sensor, an ultra-sonic sensor, a proximity sensor or a machine reading device configured to identify data on a printed label placed on the aerial delivery package.

The package launching device 100 may be configured to be between 0.5-1.5 meters in length and width; in some embodiments more preferably between 0.7-1.2 meters in length and width; in some embodiments more preferably between 0.7-0.9 meters in length and width. In another preferable configuration, the package launching device 100 is configured to be sized to fit within a footprint of existing common pallet standards such as the International Organization for Standardization (ISO) ISO 1 pallet, (0.8 meter×1.2 meters, or 31.5 inches×47.25 inches) or the ISO 3 pallet, (1.0 meter×1.2 meters, or 39.37 inches×47.25 inches), and similarly, the North American Grocery Manufacturers Association (GMA) pallet standard sizing, (e.g., 40 inches×48 inches), to comply with similar existing pallet storage and infrastructure standards. More generally, the length, width and height of the package launching device 100 may be sized to fit within a cargo or cabin area of a small cargo or passenger aircraft and sized to enable packages to be launched through a closable opening in the airframe structure.

Note, FIGS. 14-21 illustrate a dash-dot line as a partial opening representation of the external airframe opening 40 of FIGS. 1 and 2 through which an aerial delivery package may be launched by the package launching device 100.

FIGS. 15-21 depict sequential operation illustrations of the package launching device 100, (shown in part for clarity purposes of the operations), during a launching process, (FIGS. 15-17), and a retrieval process, (FIGS. 18-21).

Figure 15:
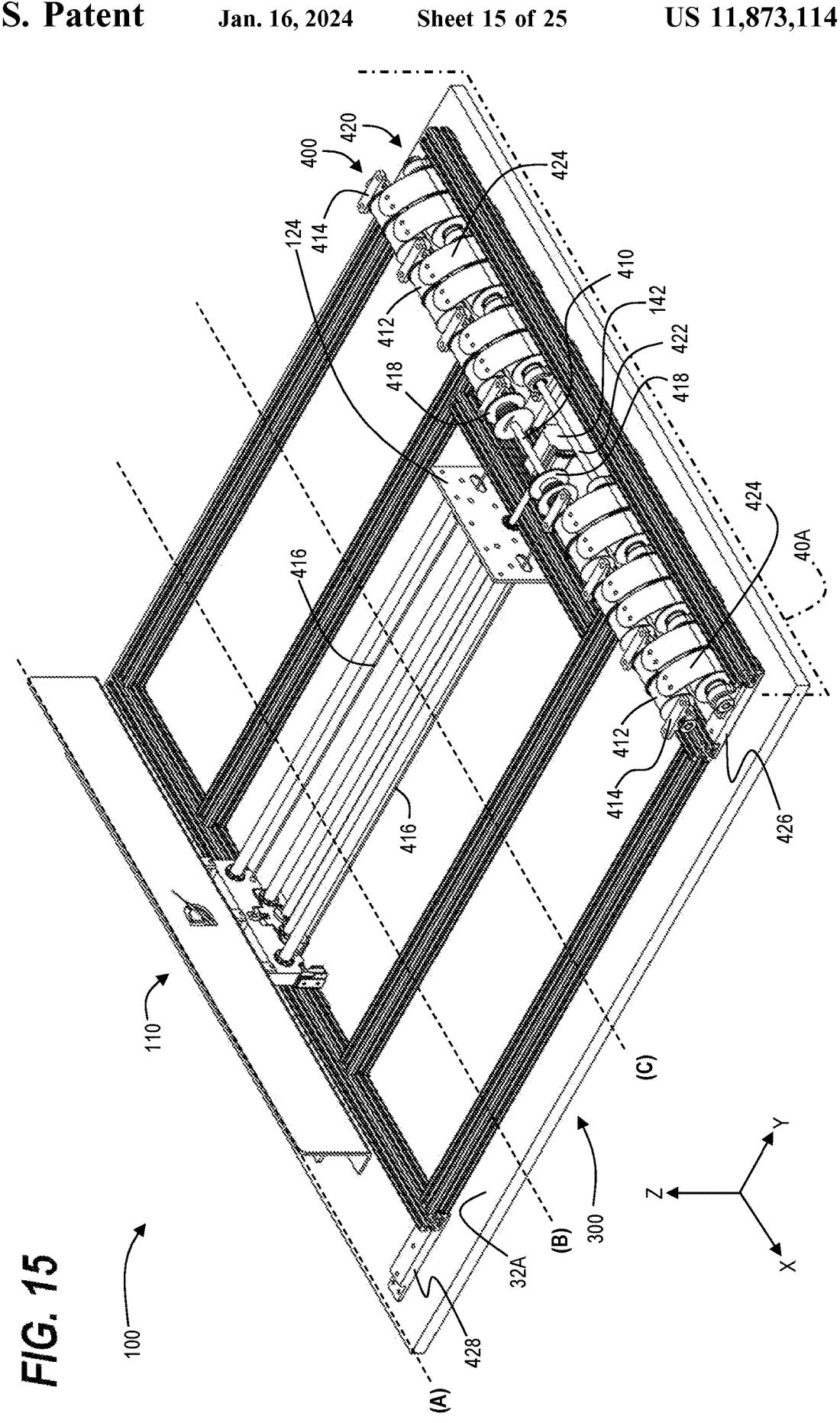
FIGS. 15-21 depict sequential operation illustrations of the package launching device during a launching process and a retrieval process.

FIG. 15 illustrates an initial locked launch position (A) of the motor carriage assembly 110. In the initial locked launch position (A), the motor carriage assembly 110 is acted upon by the trigger assembly position controller 140 to move, via the worm gear 144, the trigger assembly 150 latched to the launch assembly 180 to the initial locked launch position (A). In this initial locked launch position, an aerial delivery package (50) may be placed on the launcher bed 430, (see FIG. 14), in a downward "Z" direction.

To initiate the launching process, the trigger lever 170 of the trigger assembly 150 may either be manually moved by an operator or via control of an actuation signal activating an electronic actuator, (not shown), to release the trigger lever 170. The rotated trigger lever 170 releases the latch 176 connected to the launch carriage 190 thereby releasing the launch carriage 190, the launch table connector plate 200 and the table mounted pusher 210 to translate across the pair of launch assembly traveler shafts 134 under an applied force supplied by the torsional spring assembly 420 through the tension wires 416 of the pulley assembly 400.

Figure 16:
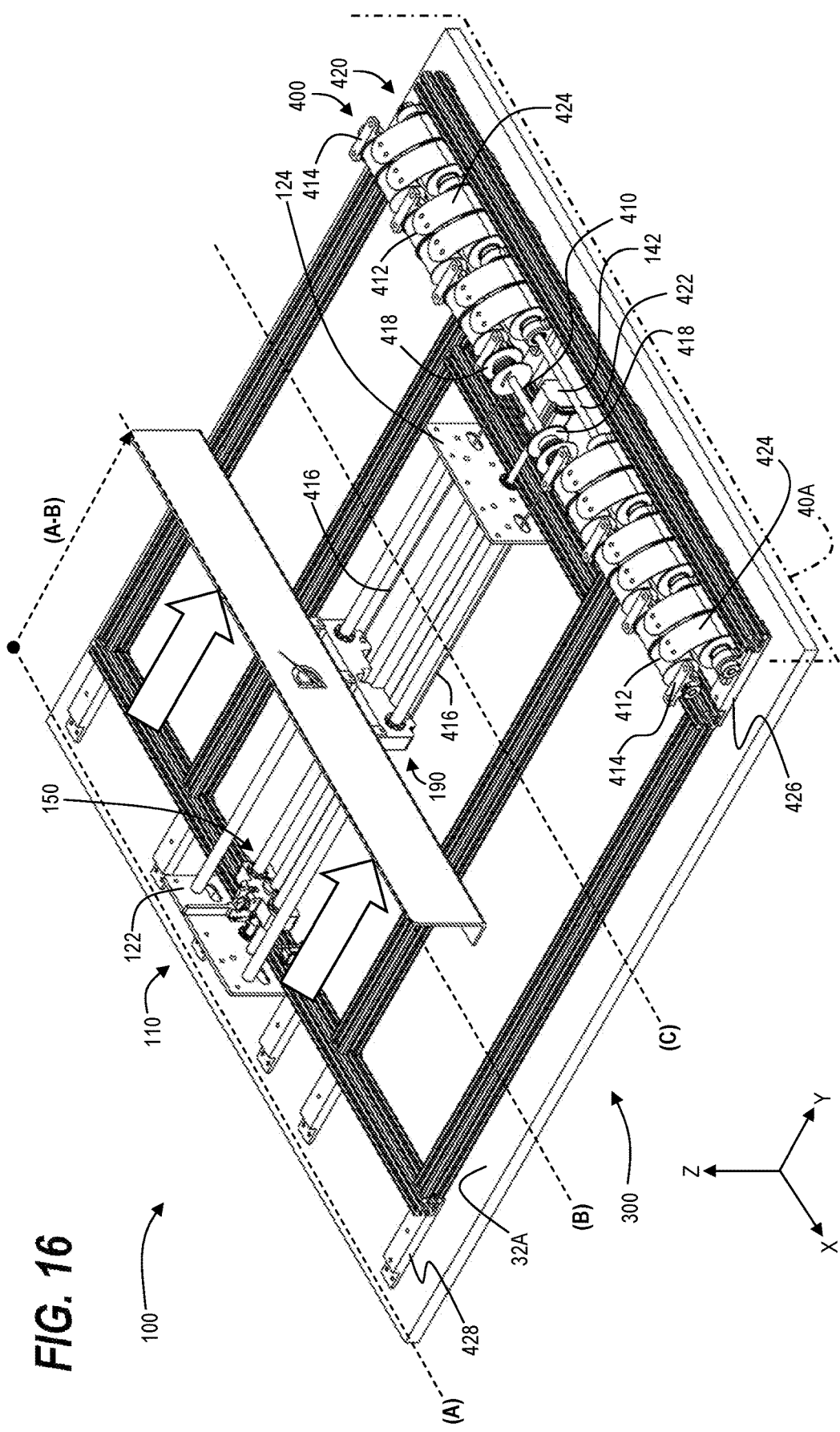

FIG. 16 further illustrates the launching process where the released launch carriage 190, the launch table connector plate 200 and the table mounted pusher 210 has moved from the initial locked launch position (A) to a mid-point of travel position (B), (over distance (A-B)), on the pair of launch assembly traveler shafts 134 still under the applied force supplied by the torsional spring assembly 420 through the tension wires 416 of the pulley assembly 400.

Figure 17:
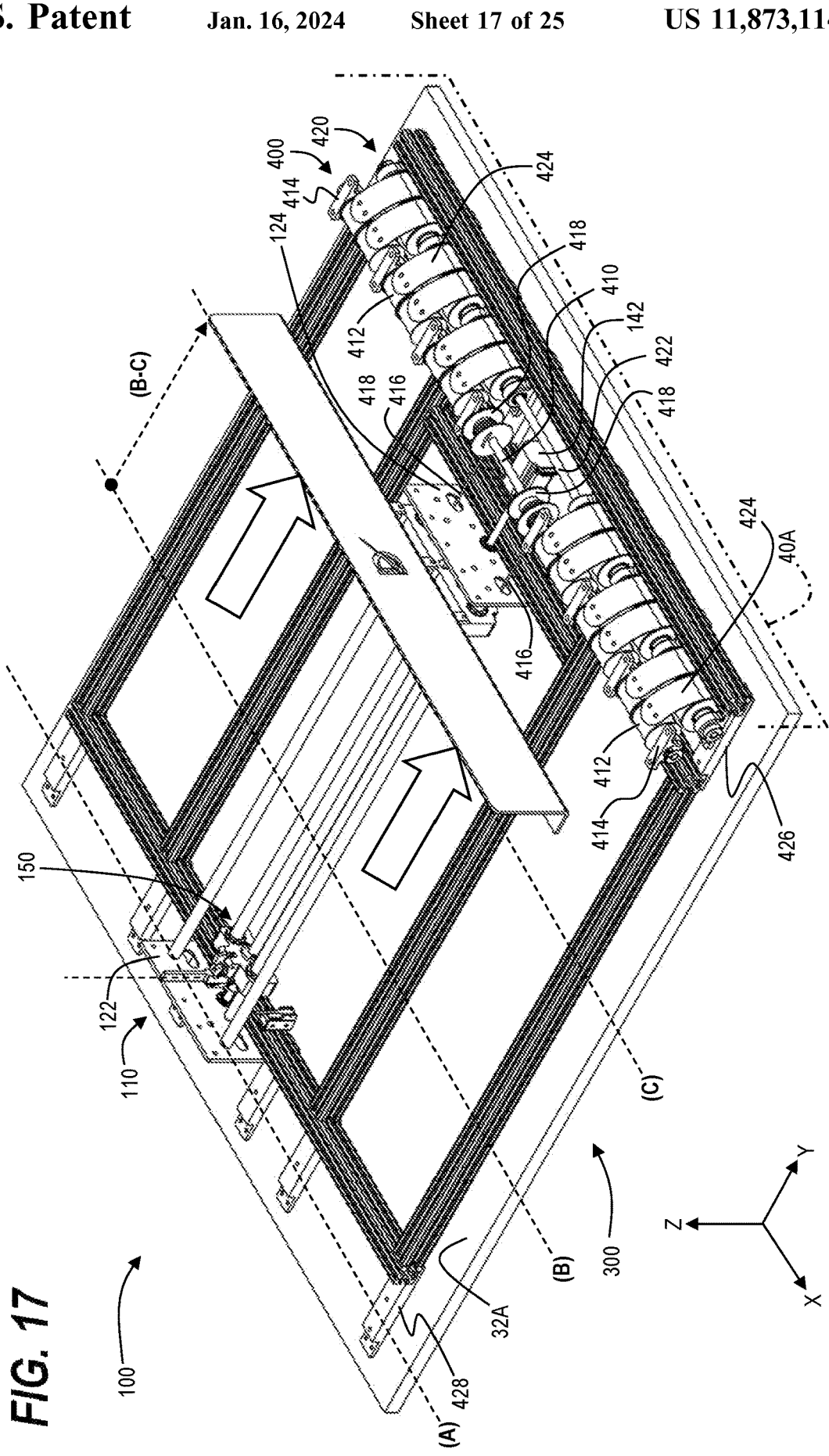

FIG. 17 illustrates the completion of the launching process where the launch carriage 190, the launch table connector plate 200 and the table mounted pusher 210 has moved from the mid-point of travel position (B) to an endpoint of travel position (C), (over distance (B-C)). At this endpoint of travel position (C), the launch carriage 190 is engaged with the forward carriage plate bumpers 126, (illustrated in FIG. 20), the tension wires 416 are substantially wound upon the tension wire take-up spools 418, and the force supplied by the torsional spring assemblies 424 on the pulley assembly 400 is substantially unloaded.

Figure 18:
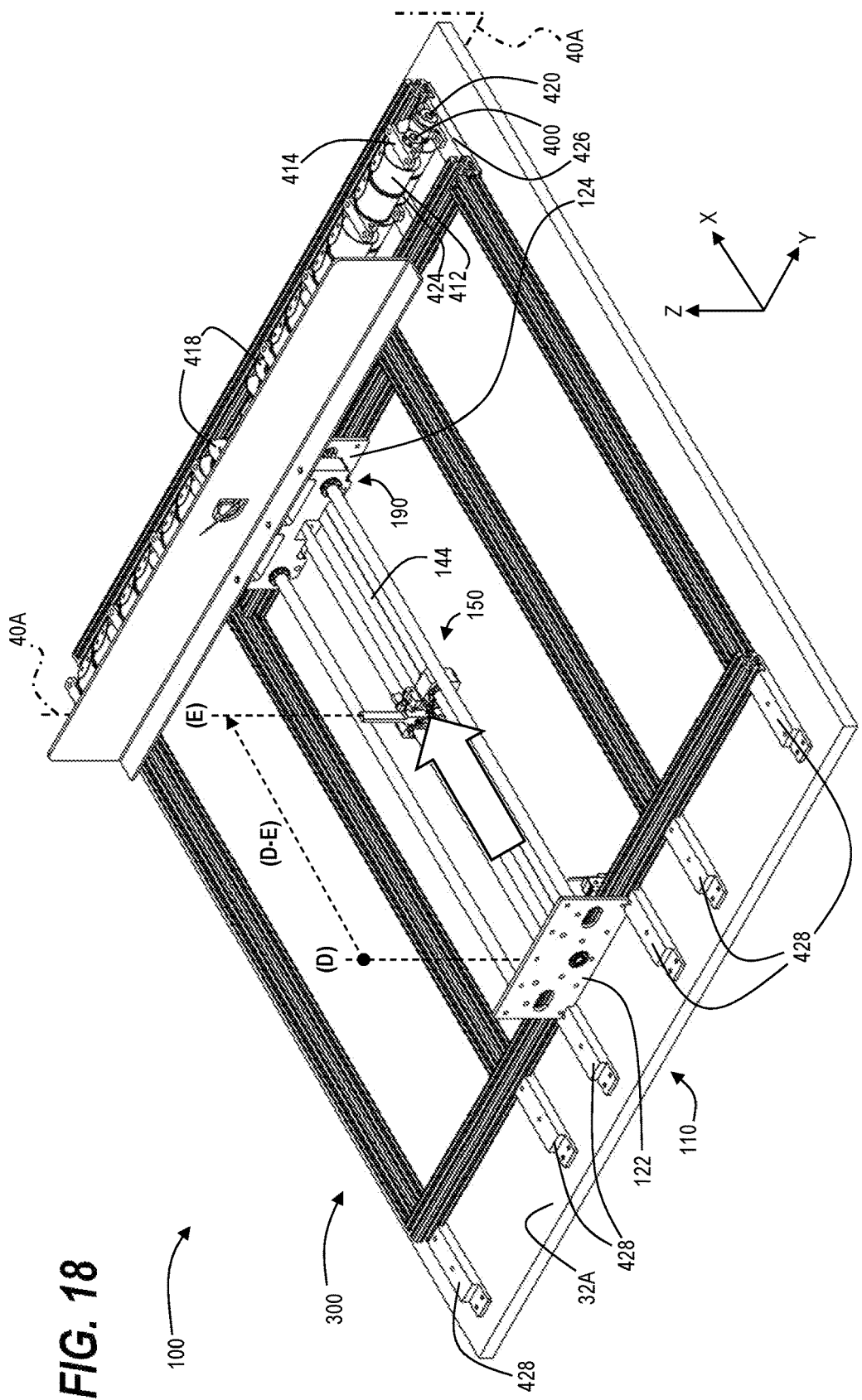

FIG. 18 illustrates the first step of a retrieval process where the trigger slide assembly 150 is moved from a launch release point (D) to at a mid-point of travel position (E), (over distance (D-E)), under control of the trigger assembly position controller 140 causing the position control motor 142 to rotate the worm gear 144 to move the trigger slide assembly 150 via the worm gear bearing 164.

Figure 19:
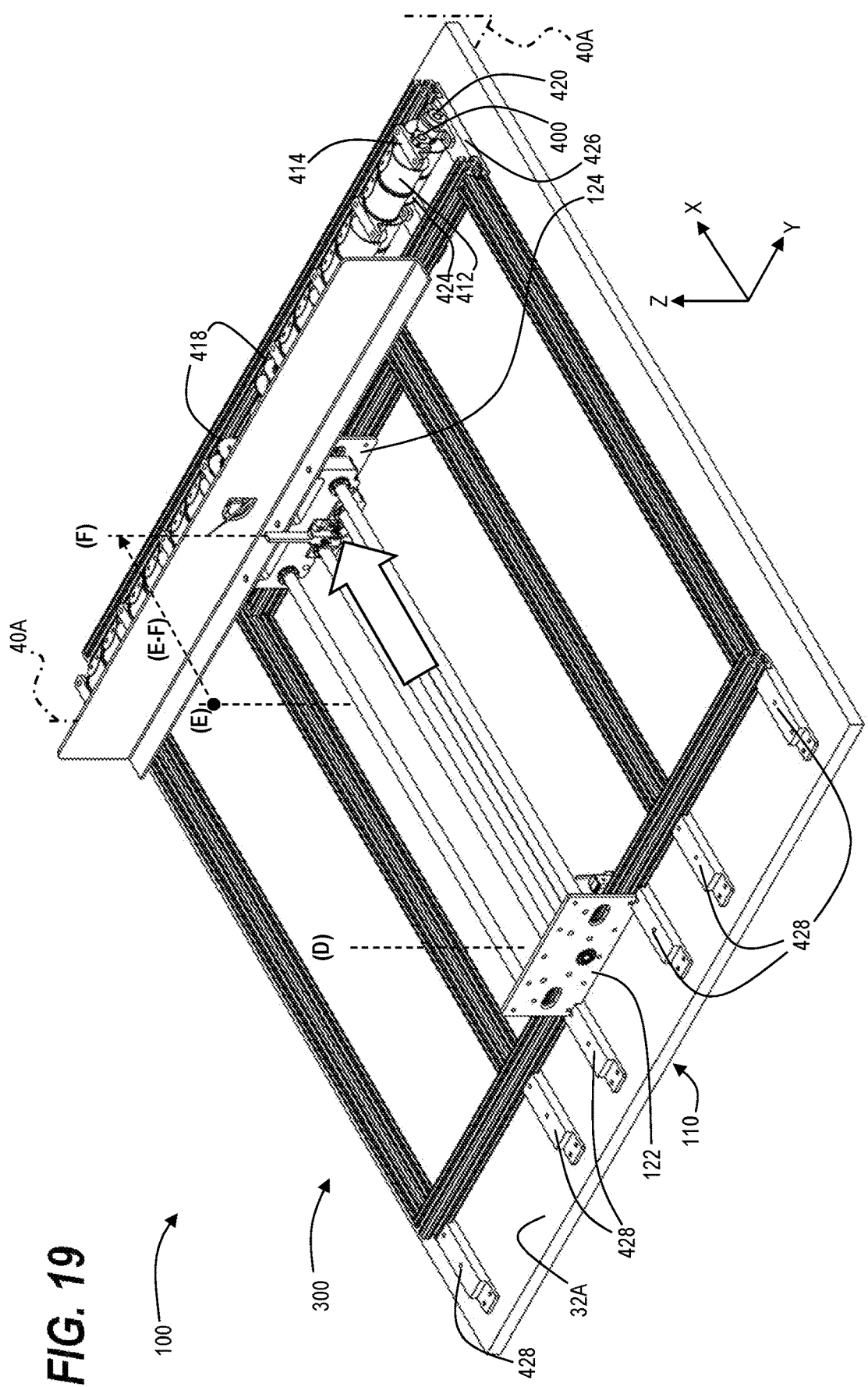

FIG. 19 illustrates the next step of the retrieval process where the trigger assembly 150 has moved from the mid-point of travel position (E) to the endpoint of travel position (F), (over distance (E-F)), and engages the launch carriage 190 at the latch catch recess 194 with the latch 176. At this end point of travel position (F), the trigger assembly position controller 140 stops the motion of the worm gear 144 with the position control motor 142.

Figure 20:
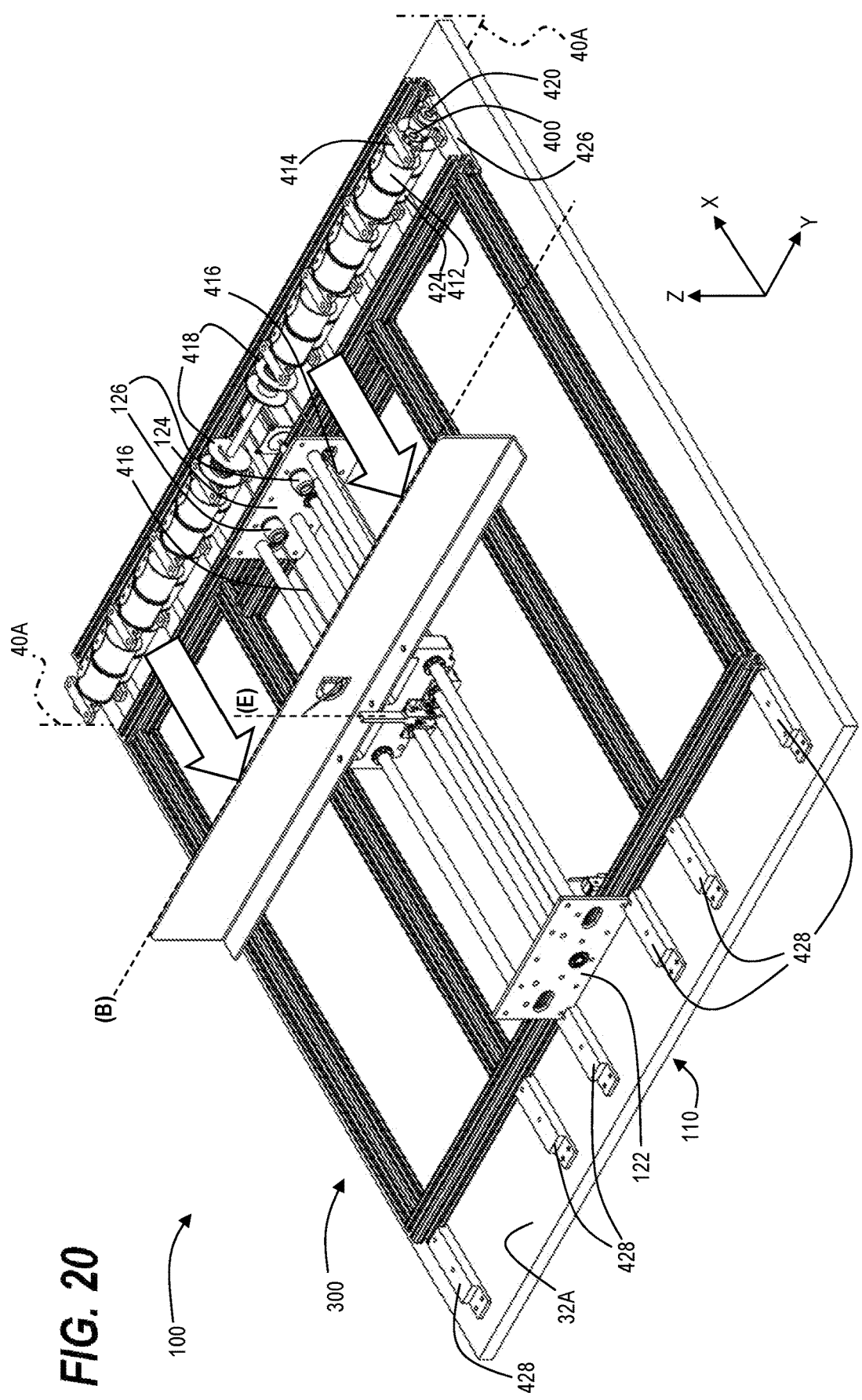

FIG. 20 illustrates the next step retrieval process where the trigger slide assembly 150 and the engaged launch carriage 190 are at a mid-point of travel (B) and (E) as the trigger assembly position controller 140 reverses direction of the position control motor 142 such that the worm gear 144 turns into opposite direction to move the motor carriage assembly 110, (including the trigger assembly 150 latched to the launch assembly 180), in a direction away from the forward carriage plate 124 and toward the initial launch position (A) and (D).

Figure 21:
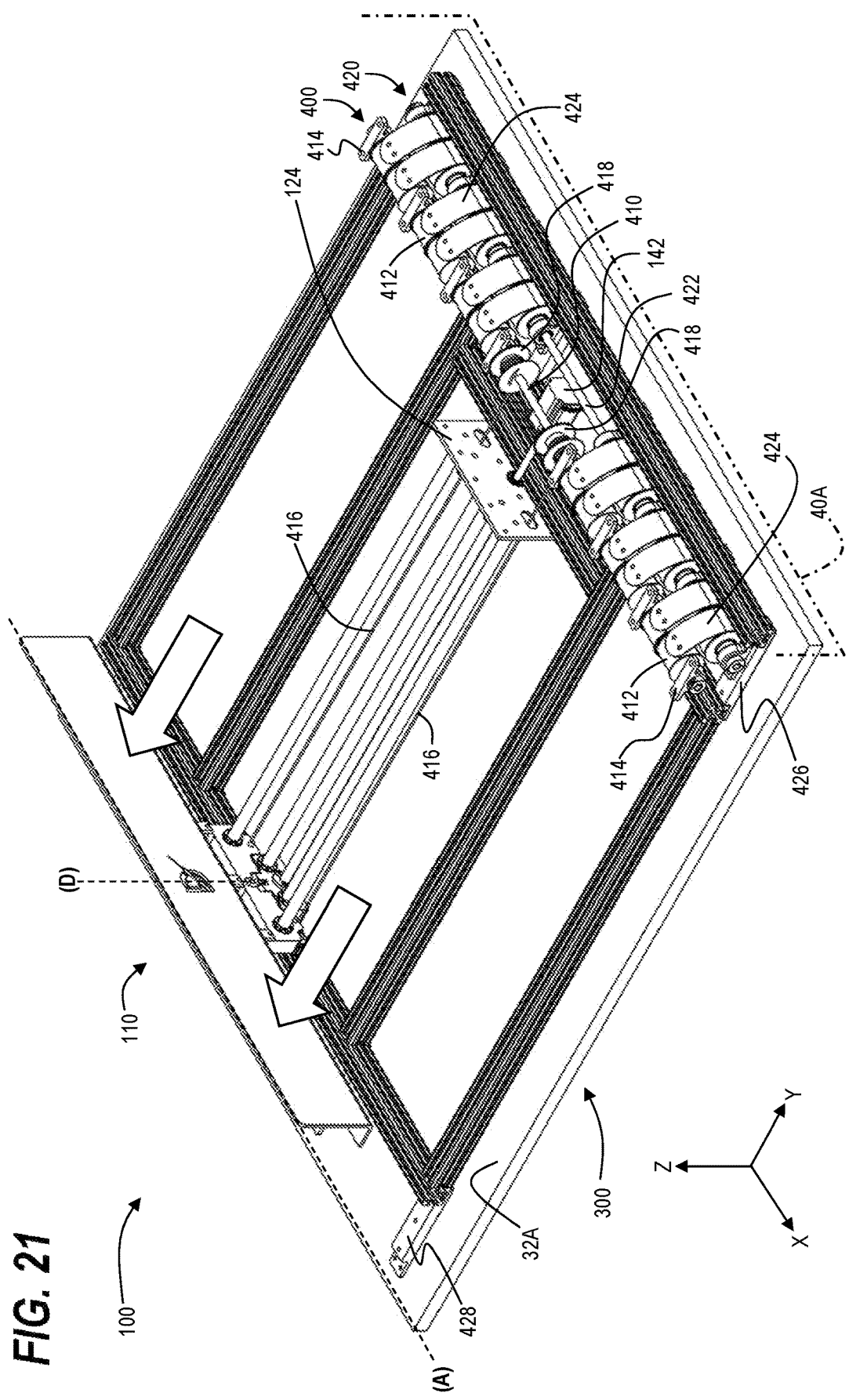

FIG. 21 illustrates the completion of the retrieval process where the trigger slide assembly 150 and the latched launch assembly 180 and are returned by the worm gear 144 and held at the initial locked launch position (A) and (D) to receive the next actuation of the trigger lever 170. The trigger assembly position controller 140 is configured to stop the rotation of the position control motor 142 driving the attached worm gear 144 thereby stopping motion of the motor carriage assembly 110 when the launch carriage position sensor 220 indicates that the motor carriage assembly 110 has reached the initial locked launch position (A) and (D).

Again, alternatives to the combination of the torsional spring, the pulley assembly and the motor carriage assembly that move top mounted pusher 210 between the launch process of an aerial deliver package 50, and a reset or reload process, may include other types of linear-based actuators. Alternative linear-based actuators may include pneumatic actuators, a hydraulic actuators, a linear motors, or other types of applied spring energy to move the top mounted pusher 210.

Figure 22:
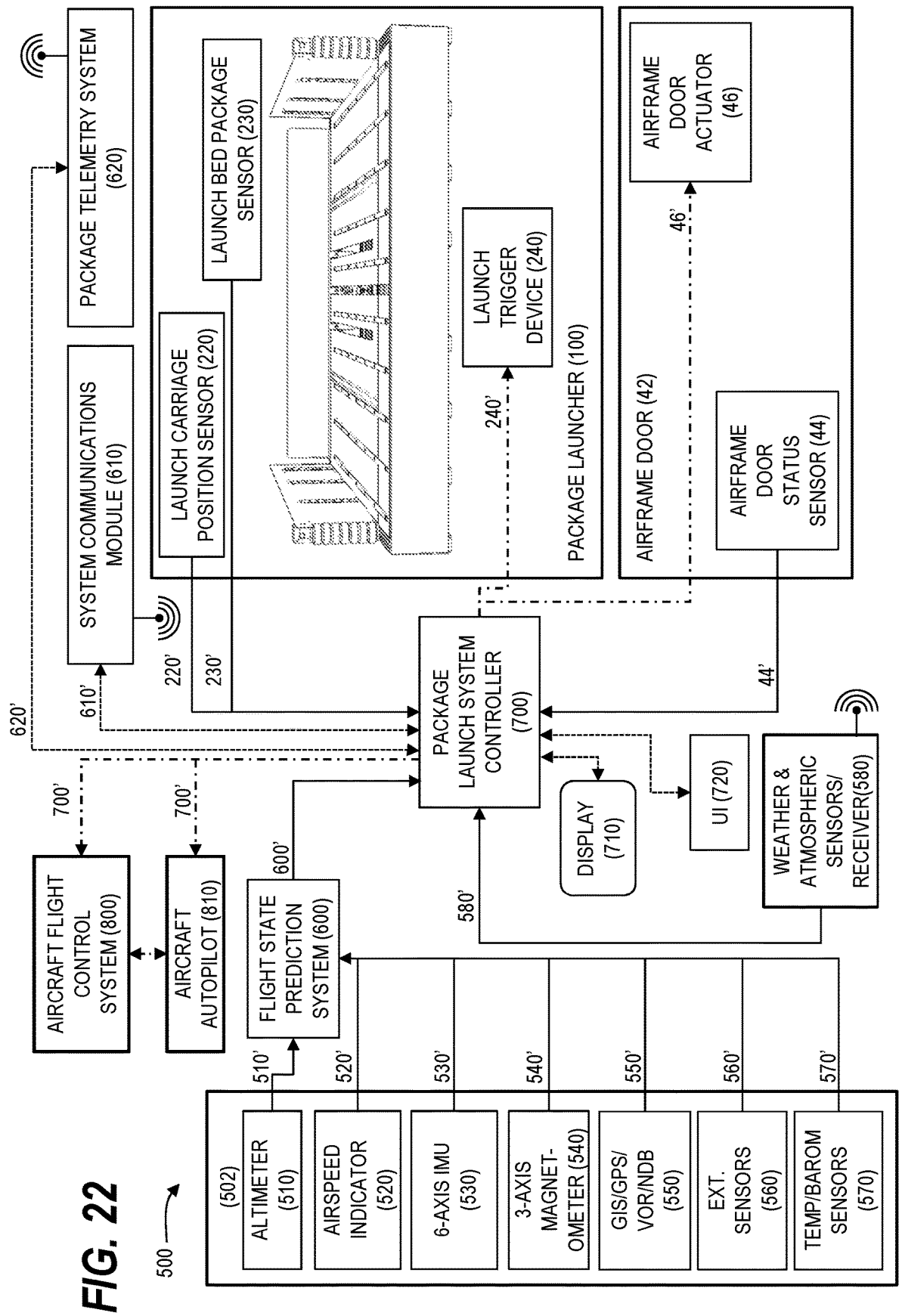
FIG. 22 illustrates a schematic diagram of a package launching system of the package launching device of FIG. 14 under operational control of a package launch system controller.

FIG. 22 illustrates a schematic diagram of a package launching system 500 using the package launching device 100 of FIG. 14 under operational control of a package launch system controller 700. (Note in FIG. 22, solid arrow lines represent signal or sensor signal input between illustrated components, dashed double-arrow lines represent the communication paths between hardware associated with the package launch system controller 700, and dot-dashed arrow lines represent control signals sent by the package launch system controller 700 to corresponding controlled components.)

A package launch system controller 700, or master flight computer, may receive a plurality of input signals from a flight status instrument sensor suite 502 that feeds into a flight state prediction system 600, an airframe door status sensor 44 and a launch carriage position sensor 220 and a launch bed package sensor 230 on the package launcher 100 to determine an optimal launching time and safety considerations for the aerial delivered package launch process.

The flight state prediction system 600 may receive signals from the flight status instrument sensor suite 502 that may include an altimeter 510 transmitting an altimeter signal 510', an airspeed indicator 520 transmitting an airspeed signal 520', a 6-axis Inertial Measurement Unit (IMU) 530 transmitting a signal 530' in six degrees-of-freedom representing a specific force, an angular rate, and an orientation of the aircraft, a 3-axis magnetometer 540, (that may be integrated in the IMU 530), transmitting a heading signal 540' in three degrees-of-freedom, and a flight location system 550, (including Geographic Information System (GIS), Global Positioning System (GPS), Very High Frequency Omni-Directional Range (VOR) and/or non-directional (radio) beacon (NDB) receivers and/or transceivers), transmitting a flight location signal 550', external sensors 560 that may receive avionic instrumentation signals external to the package launching system 500 and transmit these external signal 560, and temperature sensor and/or barometers 570 transmitting corresponding signals 570'. Each of these sensors in the flight status instrument sensor suite 502 transmit their respective signals to the flight state prediction system 600 that uses the respective received signals to continually determine a flight state of the aircraft 100. The flight state prediction system 600 outputs a flight state signal 600' to the package launch system controller 700.

The package launch system controller 700 may also receive real-time weather and atmospheric condition data 580' from various local sensors located on or proximate the aircraft 100 or on a receiver 580 gathering data from weather communication services.

The package launch system controller 700 receives the flight state prediction signal 600', the weather and atmospheric condition data signal 580', and through a user interface device 720 that may include or have a separate display 710, package-specific information including package identification data, package target location data, and package dimension and weight data. The package launch system control 700 then plots a launch time based on any of these data and may display a countdown time to a launch on the display 710 that may provide an operator sufficient notice to load the identified package into the package launcher 100 in preparation for the launching process.

The package launch system controller 700 may also communicate with an airframe door status sensor 44 to receive an airframe door status signal 44' to indicate a status of the airframe door 40 to the package launch system controller 700. The package launch system controller 700 may also output a door actuation signal 46' to an airframe door actuator 46 to control the opening and closing of the airframe door 42.

The package launch system controller 700 may also communicate with the package launcher 100 by receiving a launch carriage position signal 220' from a launch carriage position sensor 220 indicating whether the motor carriage assembly 110 as reached the initial locked launch position, and by receiving a launch bed package signal 230' from the launch bed package sensor 230 indicating whether an aerial delivery package and/or which aerial delivery package has been placed on the launcher table 430. The package launch system controller 700 may output a trigger actuation signal 240 to a launch trigger device 240 thereby initiating the launch process of the package launcher 100.

The package launch system controller 700 may include a display 710 configured to provide system status indicators, status errors and a countdown timer of the launch trigger device signal 240'. The package launch system controller 700 may additionally include a user interface 720 configured to allow an operator to review, modify or input data related to particular aerial delivery packages and their respective ground or water-based target locations relative to the real-time flight instrumentation signals 510'-570', and/or the flight location system signals 610'. Additionally, the display 710 and the user interface 720 may be integrated into a single hardware device such as a laptop, a tablet computer, or mobile communication device.

The package launch system controller 700 may additionally provide navigation signals 700' to an aircraft flight control system 800 to provide navigational control to the aircraft 10 and/or guidance to an operator of the aircraft 10 based on target package location data input into the package launch system controller 700 regarding an intended ground or water-based target location for an aerial delivery package. For example, the package launch system controller 700 may control or provide guidance to an autopilot system 810 based on an intended ground or water-based target location, and/or may provide indicators to an operator of the aircraft through the aircraft flight control system 800 to either maintain or show flight course deviation from a flight path determining by the package launch system controller 700 based on the intended ground or water-based target location and the weather and atmospheric conditions.

The package launching system 500 may further include a system communications module 610 configured to allow the package launch system controller 700 to communication with external communication systems, e.g., Wide Area Networks, (WAN), cellular telephone networks, satellite communication, Long Range (LoRa) low-power wide-area networks (LPWAN) and the like for communication package delivery status information and receiving updated package destination information.

The package launching system 500 may further includes a package telemetry system 620 configured to communication with the package pod 62 on the package while in the guided state of being delivered to the target destination. The package telemetry system 620 may include wireless communication protocols, such as, e.g., 802.11-type WiFi, cellular telephone networks, LoRA LPWAN networks and the like for continuous communication with the package while being delivered after being launched from the aircraft.

Figure 23:
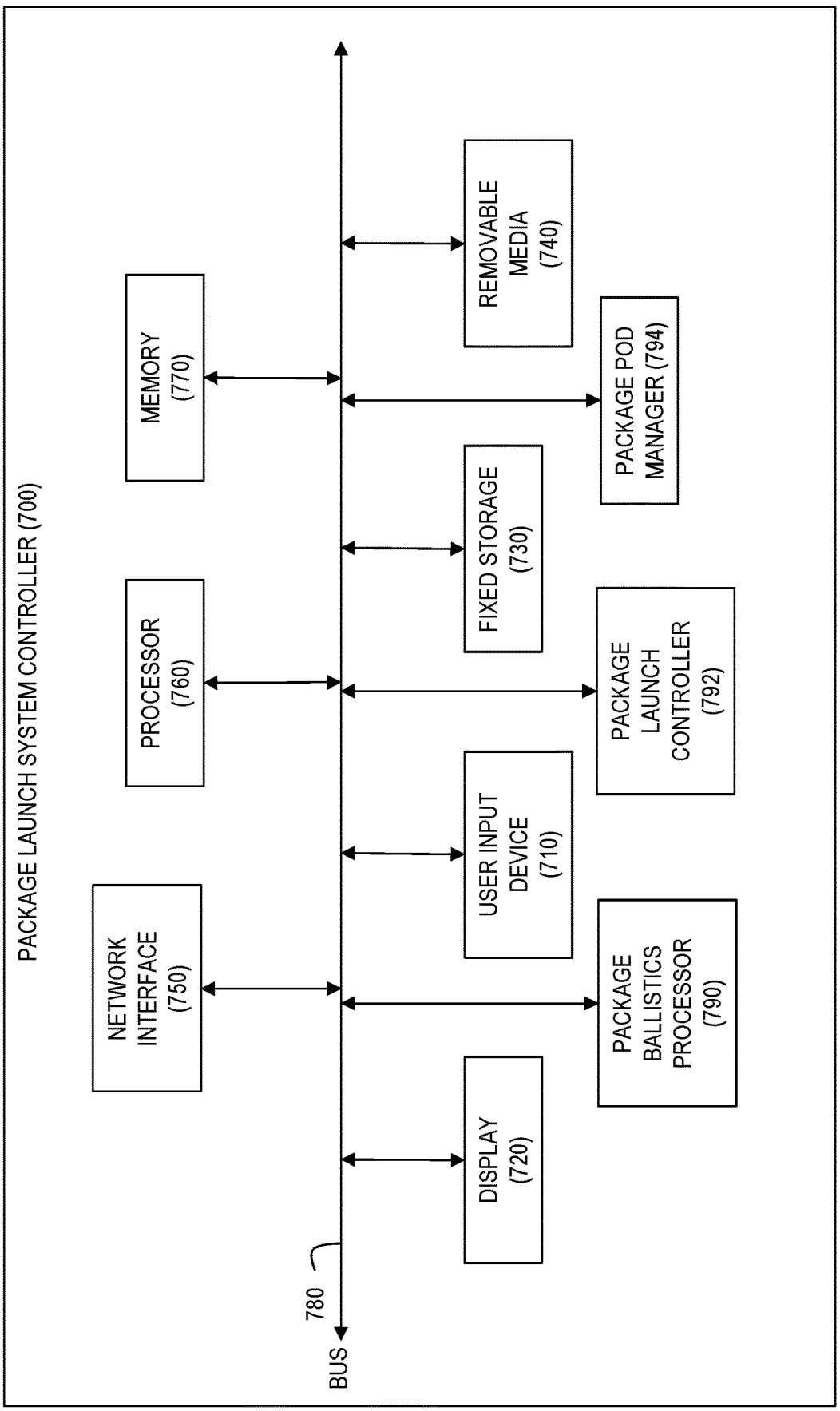
FIG. 23 illustrates a logic diagram of the package launch system controller of FIG. 22.

FIG. 23 illustrates a logic diagram of the package launch system controller 700 of FIG. 22 according to an embodiment of the disclosed subject matter. Embodiments of the presently disclosed subject matter may be implemented in and used with a variety of component and network architectures. FIG. 23 is an example package launch system controller 700 suitable for implementing embodiments of the presently disclosed subject matter. The device 700 may be, for example, a desktop or laptop computer, or a mobile computing device such as a phone, tablet, or the like. The device 700 may include a bus 780 which interconnects major components of the computer 700, such as a central processor 760, a memory 770 such as Random Access Memory (RAM), Read Only Memory (ROM), flash RAM, or the like, a user display 720 such as a display screen, a user input interface 710, which may include one or more controllers and associated user input devices such as a keyboard, mouse, touch screen, and the like, a fixed storage 730 such as a hard drive, flash storage, and the like, a removable media component 740 operative to control and receive an optical disk, flash drive, and the like, and a network interface 750 operable to communicate with one or more remote devices via a suitable network-connection.

The bus 780 allows data communication between the central processor 760 and one or more memory components, which may include RAM, ROM, and other memory, as previously noted. Typically, RAM may be the main memory into which an operating system and application programs are loaded. A ROM or flash memory component can contain, among other code, the Basic Input-Output system (BIOS) which controls basic hardware operation such as the interaction with peripheral components. Applications resident with the computer 700 are generally stored on and accessed via a computer readable medium, such as a hard disk drive (e.g., fixed storage 730), an optical drive, floppy disk, or other storage medium.

The fixed storage 730 may be integral with the computer 700 or may be separate and accessed through other interfaces. The network interface 750 may provide a direct connection to a remote server via a wired or wireless connection. The network interface 750 may provide such connection using any suitable technique and protocol as will be readily understood by one of skill in the art, including digital cellular telephone, Wi-Fi, Bluetooth®, near-field, and the like. For example, the network interface 750 may allow the package launch system controller 700 to communicate with other computers or devices via one or more local, wide-area, or other communication networks, or other input and output devices as illustrated in FIG. 22, (flight instrumentation 502 and related components, flight navigation control system 600 and related components, package launcher 100, airframe door 42, etc.)

Many other devices or components (not shown) may be connected in a similar manner (e.g., document scanners, digital cameras and so on). Conversely, all the components shown in FIG. 23 need not be present to practice the present disclosure. The components can be interconnected in different ways from that shown. The operation of a computer such as that shown in FIG. 23 is readily known in the art and may not be discussed in detail in this application. Code to implement the present disclosure can be stored in computer-readable storage media such as one or more of the memory 770, fixed storage 730, removable media 740, or on a remote storage location.

A package ballistics processor 790 is in communication with the processor 760 via the communication bus 790 and is configured to calculate the dynamic trajectory of a dropped system from air to ground by performing a "forward computing" ballistics trajectory and target location calculation on the package when launched from the aircraft based on the current sensor data. The package ballistics processor 790 may also perform a Monte Carlo-type simulation to predict the probability of different outcomes when the intervention of random variables are present to determine a probability field of where launched packages could potentially land. The ballistic processor 790 may determine a dynamic trajectory calculation to determine the correct time and location of the aircraft to launch the package, may provide course correction information to guide the pilot to the correct launch location, (for example, via navigation signals 700' to either the aircraft flight control system 800 or the aircraft autopilot 810), and may monitor the package in real time, (via package telemetry system 620 and package pod manager 794), to confirm that the package stays in the calculated trajectory path to its intended target location.

A package launch controller 792 is in communication with the processor 760 via the communication bus 780 and is configured to receive a package ballistics solution from the package ballistics processor 790, to determine if a package has been loaded on the package launcher 100 and that the airframe door 42 is in an open position before launching a package at a specific time, and to launch the package at the calculated time and position of the aircraft.

A package pod communication manager 794 is in communication with the processor 760 via the communication bus 780 and is configured to manage communications with the package communications pod 62 via the telemetry system 620 while the package is descending from the aircraft 100 to its target destination to thereby confirm the calculated flightpath of the packaged with the actual flightpath of the package and further confirm the calculated target location for the package with an actual landing location of the package.

Figure 24:
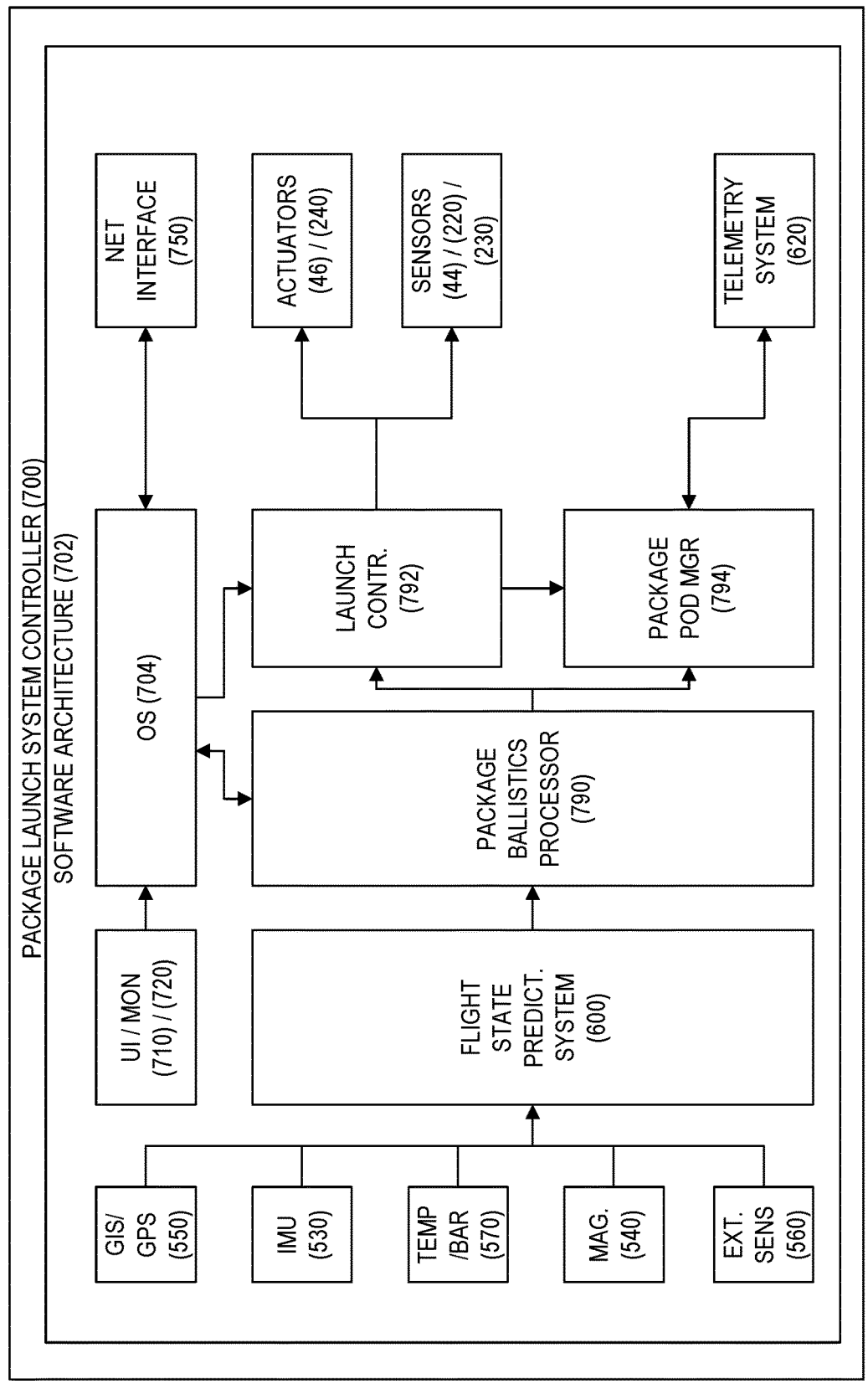
FIG. 24 illustrates a software architecture 702 for the package launch system controller 700 of FIGS. 22 and 23.

FIG. 24 illustrates a software architecture 702 for the package launch system controller 700 of FIGS. 22 and 23. The software architecture 702 is a representative diagram of different input, processing and output states of the package launch system controller 700 software architecture.

A mentioned previously, the flight state prediction system 600 receives input, for example, from the flight location system 550, the 6-axis IMU 530, the temperature and barometer sensors 570, the 3-axis magnetometer 540, and from various external sensors 560, to calculate a flight state. The calculated flight state is then fed into the package ballistics processor 780 under control of the operating system (OS) 704 through which either a user via a user interface 710 and/or touch-screen monitor 720 or remotely via a network interface 750 has input particular package target coordinates. The package ballistics processor 780 calculates a package launch solution which is fed to the launch controller 792 which checks airframe door and package launch device sensors 44, 220 and 230 to determine if a package is capable of safely being launched at a calculated time. If the package is determined to be safely launched, the launch controller 792 activates the airframe door actuator 46 and the package launch actuator 240 to launch the package at the calculated launch time.

Figure 25:
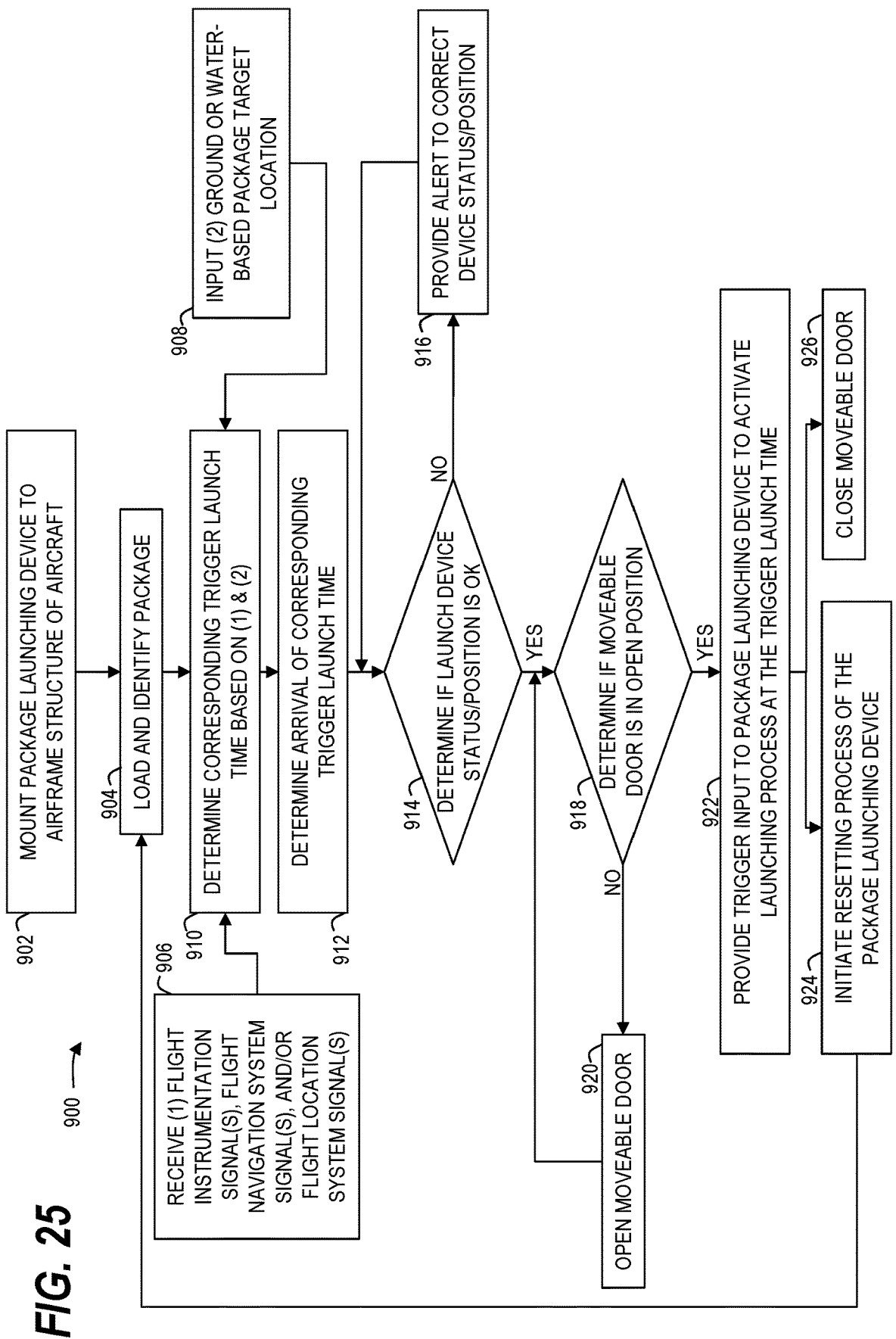
FIG. 25 illustrates a logic flowchart diagram of a method of operating a package launching system with the package launching device of FIG. 14.

FIG. 25 illustrates a logic flowchart diagram of a method of operating a package launching system 900 with the package launching device 100 of FIG. 14.

The method starts by mounting 902 the package launching device 100 to the airframe structure 20 of an aircraft 10. An aerial delivery package 50 is loaded 904 on the launcher table of the package launching device 100 and identified to the package launching system 500 by either manually inputting an aerial delivery package identifier to a package launch system controller 700 or by machine reading a label on the aerial delivery package that provides identification to the package launch system controller 700.

The method may then either simultaneously or sequentially receive 906 flight instrumentation signals, flight navigation system signals, and/or flight location system signals, and receive input 908 regarding a ground or water-based package target location for the loaded an identified aerial delivery package.

The method may then determine 910 a corresponding trigger launch time based on receiving the flight instrumentation signals, the flight navigation system signals, the flight location system signals, and/or the ground or water-based package target location.

The method may then provide a countdown to the trigger launch time, provide navigation guidance for operational control of the aircraft 10 based on the input ground or water-based package target location and current aircraft and weather parameters, and determine 912 arrival of the corresponding determining trigger launch time. Each of these functions may be displayed on a display device of the package launch system controller for presentation to an operator.

Immediately or shortly before the trigger launch time, the method determines 914 if the launch device status and/or position is enabled and safe to initiate the launch in process. This determination may be based on the launch carriage position sensor 220 and the launch bed package sensor 230 sending corresponding signals to the package launch system controller 700 indicating that the launch carriage assembly is in the initial locked position and the launch bed package sensor has identified either that 1) an aerial delivery package is on the package launcher table 430, or 2) or a specifically identified aerial delivery package is on the package launcher table 430. The latter option may be beneficial to identify an aerial delivery package that does not match a ground or water-based target location identified to the package launch system controller 700. An alert is provided 916 to an operator to either place a correct aerial delivery package on the package launch a table 430 consistent with the target location, or reenter a different ground or water-based target location into the package launch system controller 700 for the loaded the aerial delivery package.

The method may then determine 918 if the aircraft movable door 42 is in an open-door position 42B, (see, e.g., FIG. 2), so as not to interfere with the launching process of the aerial delivery package. If it is determined that the movable door 42 is in a closed-door position 42A, (see, e.g., FIG. 1), the package launch system controller 700 issues and airframe door actuator signal 46' two move the airframe door 42 into an open-door position 42B. Alternatively, the package launch system controller 700 may provide a visual door closed indicator on a display device connected to the package launch system controller 700 sufficient for an operator to see thereby prompting the operator to manually open the movable door 42.

The method may provide 922 the trigger input signal to the package launching device 100 to activate the launch and process at the determined trigger launch time. Alternatively, the method may provide a visual trigger signal indication on a display device connected to the package launch system controller 700 sufficient for an operator to see and thereby prompt the operator to manually trigger the package launch and device 100.

The method may then either simultaneously or sequentially initiate 924 a resetting process of the package launching device 100, and/or close the mobile door 42 either automatically under control of the package launch system controller 700 or manually by prompting an operator in the same manner as described above. The resetting process, as described above and in FIGS. 20-21, is controlled by the trigger assembly position controller 140 where the worm gear 144 is rotated by the position control motor 142 to move the entire motor carriage assembly 110 back to its initial locked position to enable receipt of another aerial delivery package with a new ground or water-based target location.

The present disclosure provides various systems, techniques, and arrangements, including but not limited to the following.

An airframe-mounted package launching system including an airframe structure of an aircraft including an external airframe opening, and a package launching device mounted in an interior portion of the airframe structure proximate the external airframe opening. The package launching device further includes a launch bed configured to support a package during a launching process, and a launch assembly configured to impart a launching force to the supported package on the launch bed during the launching process.

The launch assembly includes a launch carriage configured to translate under an applied force from a first locked position toward a second stopped position during the launching process, and a trigger assembly configured to hold the launch carriage in the first locked position, release the launch carriage from the first locked position when the trigger assembly receives a trigger input thereby initiating the launching process, retrieve the launch carriage from the second stopped position during a retrieval process, and translate, during the retrieval process, the launch carriage against the applied force into the first locked position.

The external airframe opening further includes a moveable door configured to move between an open and a closed position relative to the external airframe opening. The airframe-mounted package launching system further includes a package launch controller configured to control the moveable door between the open and the closed position relative to the launching process of the package launching device.

The airframe-mounted package launching system further includes a package launch controller configured to provide the trigger input to the trigger assembly to initiate the launching process of the package launching device. The package launch controller may receive at least one of: a flight instrumentation signal, a flight navigation system signal, a flight location system signal; a launch assembly device status or position sensor signal, and an airframe door status or position sensor signal.

The launch assembly further includes a pulley assembly connected to a pulley wire that supplies the applied force to the launch carriage, where the applied force biases the launch carriage toward the second stopped position.

The launch assembly further includes a torsional spring assembly connected to and supplying the applied force to the pulley assembly.

The launch assembly further includes at least one trigger assembly traveler shaft configured to support the trigger assembly to traverse between the first locked position and the second stopped position.

The launch assembly further includes at least one launch assembly traveler shaft configured to support the launch carriage to traverse between the first locked position and the second stopped position.

The trigger assembly further includes a locking latch configured to engage a corresponding engagement portion on the launch carriage to thereby enable retrieving the launch carriage from the second stopped position, translating the launch carriage between the second stopped position and the first locked position, and holding the launch carriage at the first locked position.

The launch assembly further includes a worm gear connected to the trigger assembly and configured to translate, as the worm gear is rotated, the trigger assembly between the first locked position and the second stopped position of the launch carriage.

The launch assembly further includes a package launch controller configured to perform a forwarding computing package ballistics trajectory calculation for at least one of a package ballistics trajectory of the package when launched from the aircraft and a package target location.

The package launch controller further configured to perform a simulation to predict a probability field of different package ballistics trajectory outcomes and different package target location outcomes given an intervention of random variables that may influence at least one of the package ballistics trajectory and the package target location.

The package launch controller further configured to provide a course correction signal to one of the pilot of the aircraft or an autopilot system of the aircraft based on the forwarding computing package ballistics trajectory calculation.

The package launch controller further configured to monitor the package in real time to confirm the package stays in the calculated trajectory path to its intended target location.

A package launching device configured to be attached to an aircraft airframe structure proximate an external airframe opening includes a launch bed configured to support a package during a launching process, and a launch assembly configured to impart a launching force to the supported package on the launch bed during the launching process.

The launch assembly further includes a launch carriage configured to translate under an applied force from a first locked position toward a second stopped position during the launching process, and a trigger assembly configured to hold the launch carriage in the first locked position, release the launch carriage from the first locked position when the trigger assembly receives a trigger input thereby initiating the launching process, retrieve the launch carriage from the second stopped position during a retrieval process, and translate, during the retrieval process, the launch carriage against the applied force into the first locked position.

The launch assembly further includes a pulley assembly connected by a pulley wire that supplies the applied force to the launch carriage, where the applied force biases the launch carriage toward the second stopped position.

The launch assembly further includes a torsional spring assembly connected to and supplying the applied force to the pulley assembly.

The launch assembly further includes at least one trigger assembly traveler shaft configured to support the trigger assembly to traverse between the first locked position and the second stopped position.

The launch assembly further includes at least one launch assembly traveler shaft configured to support the launch carriage to traverse between the first locked position and the second stopped position.

The trigger assembly further includes a locking latch configured to engage a corresponding engagement portion on the launch carriage to thereby enable retrieving the launch carriage from the second stopped position, translating the launch carriage between the second stopped position and the first locked position, and holding the launch carriage at the first locked position.

The launch assembly further includes a worm gear connected to the trigger assembly and configured to translate, as the worm gear is rotated, the trigger assembly between the first locked position and the second stopped position of the launch carriage.

A method of operating an airframe package launching system includes mounting a package launching device to an airframe structure of an aircraft, providing a trigger input to the package launching device configured to activate a launching process to launch a package from the package launching device through an external airframe opening of the aircraft, and initiating a resetting process of the package launching device configured to enable another package to be subject to a second launching process.

The method further includes providing the trigger input by determining, from a package launch controller and before providing the trigger input, a moveable door configured to move between an open and a closed position relative to the external airframe opening is in the open position.

The method further includes providing the trigger input by determining, from a package launch controller and before providing the trigger input, a moveable door configured to move between an open and a closed position relative to the external airframe opening is in the closed position, and providing, via the package launch controller and before providing the trigger input, a moveable door actuator signal configured to move the moveable door into the open position.

The method further includes providing the trigger input by providing a package launch controller that receives, before providing the trigger input, at least one of a flight instrumentation signal, a flight navigation system signal, a flight location system signal, a launch assembly device status or position sensor signal, and an airframe door status or position sensor signal.

The method further includes providing the trigger input by determining, by the package launch controller based on the flight instrumentation signal and a ground-based package target location, a corresponding time to provide the trigger input to the package launching device, and issuing, by the package launch controller, the trigger input to the package launching device at the corresponding time.

The method further includes providing the trigger input by determining, by the package launch controller based on the flight navigation system signal and a ground-based package target location, a corresponding time to provide the trigger input to the package launching device, and issuing, by the package launch controller, the trigger input to the package launching device at the corresponding time.

The method further includes providing the trigger input by determining, by the package launch controller based on the flight location system signal and a ground-based package target location, a corresponding time to provide the trigger input to the package launching device, and issuing, by the package launch controller, the trigger input to the package launching device at the corresponding time.

The method further includes providing the trigger input by determining, by the package launch controller and a ground-based package target location, a corresponding time to provide the trigger input to the package launching device, and preventing, by the package launch controller, the trigger input to the package launching device at the corresponding time based on the launch assembly device status or position sensor signal.

The method further includes providing the trigger input by determining, by the package launch controller and a ground-based package target location, a corresponding time to provide the trigger input to the package launching device, and preventing, by the package launch controller, the trigger input to the package launching device at the corresponding time based on the airframe door status or position sensor signal.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. An airframe-mounted package launching system comprising:
   an airframe structure of an aircraft including an external airframe opening; and
   a package launching device mounted in an interior portion of the airframe structure proximate the external airframe opening, wherein the package launching device comprises
      a launch bed configured to support a package during a launching process; and
      a launch assembly configured to impart a launching force to the supported package on the launch bed during the launching process, wherein the launch assembly includes
         a launch carriage configured to translate under an applied force from a first locked position toward a second stopped position during the launching process, and
         a trigger assembly configured to
            hold the launch carriage in the first locked position,
            release the launch carriage from the first locked position when the trigger assembly receives a trigger input thereby initiating the launching process,
            retrieve the launch carriage from the second stopped position during a retrieval process, and
            translate, during the retrieval process, the launch carriage against the applied force into the first locked position.

2. The airframe-mounted package launching system of claim 1,
   wherein the external airframe opening include a moveable door configured to move between an open and a closed position relative to the external airframe opening.

3. The airframe-mounted package launching system of claim 2, further comprising a package launch controller configured to control the moveable door between the open and the closed position relative to the launching process of the package launching device.

4. The airframe-mounted package launching system of claim 1, further comprising a package launch controller configured to provide the trigger input to the trigger assembly to initiate the launching process of the package launching device.

5. The airframe-mounted package launching system of claim 4, wherein the package launch controller receives at least one of:
   a flight instrumentation signal;
   a flight navigation system signal;
   a flight location system signal;
   a launch assembly device status or position sensor signal; and
   an airframe door status or position sensor signal.

6. The airframe-mounted package launching system of claim 1, wherein the launch assembly further comprises a pulley assembly connected to a pulley wire that supplies the applied force to the launch carriage,
   wherein the applied force biases the launch carriage toward the second stopped position.

7. The airframe-mounted package launching system of claim 6, wherein the launch assembly further comprises a torsional spring assembly connected to and supplying the applied force to the pulley assembly.

8. The airframe-mounted package launching system of claim 1, wherein the launch assembly further comprises at least one trigger assembly traveler shaft configured to support the trigger assembly to traverse between the first locked position and the second stopped position.

9. The airframe-mounted package launching system of claim 1, wherein the launch assembly further comprises at least one launch assembly traveler shaft configured to support the launch carriage to traverse between the first locked position and the second stopped position.

10. The airframe-mounted package launching system of claim 1, wherein the trigger assembly further comprises a locking latch configured to engage a corresponding engagement portion on the launch carriage to thereby enable
   retrieving the launch carriage from the second stopped position,
   translating the launch carriage between the second stopped position and the first locked position, and
   holding the launch carriage at the first locked position.

11. The airframe-mounted package launching system of claim 1, wherein the launch assembly further comprises a worm gear connected to the trigger assembly and configured to translate, as the worm gear is rotated, the trigger assembly between the first locked position and the second stopped position of the launch carriage.

12. The airframe-mounted package launching system of claim 1, further comprising a package launch controller configured to perform a forwarding computing package ballistics trajectory calculation for at least one of a package ballistics trajectory of the package when launched from the aircraft and a package target location.

13. The airframe-mounted package launching system of claim 12, the package launch controller further configured to perform a simulation to predict a probability field of different package ballistics trajectory outcomes and different package target location outcomes given an intervention of random variables that may influence at least one of the package ballistics trajectory and the package target location.

14. The airframe-mounted package launching system of claim 12, the package launch controller further configured to provide a course correction signal to one of the pilot of the aircraft or an autopilot system of the aircraft based on the forwarding computing package ballistics trajectory calculation.

15. The airframe-mounted package launching system of claim 12, the package launch controller further configured to monitor the package in real time to confirm the package stays in the calculated trajectory path to its intended target location.

16. A package launching device configured to be attached to an aircraft airframe structure proximate an external airframe opening, the package launch device comprising:
   a launch bed configured to support a package during a launching process; and
   a launch assembly configured to impart a launching force to the supported package on the launch bed during the launching process, wherein the launch assembly includes
      a launch carriage configured to translate under an applied force from a first locked position toward a second stopped position during the launching process, and
      a trigger assembly configured to
         hold the launch carriage in the first locked position,
         release the launch carriage from the first locked position when the trigger assembly receives a trigger input thereby initiating the launching process,
         retrieve the launch carriage from the second stopped position during a retrieval process, and
         translate, during the retrieval process, the launch carriage against the applied force into the first locked position.

17. The package launching device of claim 16, wherein the launch assembly further comprises a pulley assembly connected by a pulley wire that supplies the applied force to the launch carriage,
   wherein the applied force biases the launch carriage toward the second stopped position.

18. The package launching device of claim 17, wherein the launch assembly further comprises a torsional spring assembly connected to and supplying the applied force to the pulley assembly.

19. The package launching device of claim 16, wherein the launch assembly further comprises at least one trigger assembly traveler shaft configured to support the trigger assembly to traverse between the first locked position and the second stopped position.

20. The package launching device of claim 16, wherein the launch assembly further comprises at least one launch assembly traveler shaft configured to support the launch carriage to traverse between the first locked position and the second stopped position.

21. The package launching device of claim 16, wherein the trigger assembly further comprises a locking latch configured to engage a corresponding engagement portion on the launch carriage to thereby enable
   retrieving the launch carriage from the second stopped position,
   translating the launch carriage between the second stopped position and the first locked position, and
   holding the launch carriage at the first locked position.

22. The package launching device of claim 16, wherein the launch assembly further comprises a worm gear connected to the trigger assembly and configured to translate, as the worm gear is rotated, the trigger assembly between the first locked position and the second stopped position of the launch carriage.

23. A method of operating an airframe package launching system, the method comprising:
   mounting a package launching device to an airframe structure of an aircraft, the package launching device configured to be mounted in an interior portion of the airframe structure proximate an external airframe opening, wherein the package launching device further includes a launch bed configured to support a package during a launching process, and a launch assembly configured to impart a launching force to the supported package on the launch bed during the launching process;
   providing a trigger input to the package launching device configured to activate a launching process to launch a package from the package launching device through an external airframe opening of the aircraft; and
   initiating a resetting process of the package launching device configured to enable another package to be subject to a second launching process.

24. The method of operating the airframe package launching system of claim 23, wherein providing the trigger input further comprises:

determining, from a package launch controller and before providing the trigger input, a moveable door configured to move between an open and a closed position relative to the external airframe opening is in the open position.

25. The method of operating the airframe package launching system of claim 23, wherein providing the trigger input further comprises:
    determining, from a package launch controller and before providing the trigger input, a moveable door configured to move between an open and a closed position relative to the external airframe opening is in the closed position; and
    providing, via the package launch controller and before providing the trigger input, a moveable door actuator signal configured to move the moveable door into the open position.

26. The method of operating the airframe package launching system of claim 23, wherein providing the trigger input further comprises providing a package launch controller that receives, before providing the trigger input, at least one of:
    a flight instrumentation signal;
    a flight navigation system signal;
    a flight location system signal;
    a launch assembly device status or position sensor signal; and
    an airframe door status or position sensor signal.

27. The method of operating the airframe package launching system of claim 23, wherein providing the trigger input further comprises:
    determining, by the package launch controller based on the flight instrumentation signal and a ground-based package target location, a corresponding time to provide the trigger input to the package launching device; and
    issuing, by the package launch controller, the trigger input to the package launching device at the corresponding time.

28. The method of operating the airframe package launching system of claim 23, wherein providing the trigger input further comprises:
    determining, by the package launch controller based on the flight navigation system signal and a ground-based package target location, a corresponding time to provide the trigger input to the package launching device; and
    issuing, by the package launch controller, the trigger input to the package launching device at the corresponding time.

29. The method of operating the airframe package launching system of claim 23, wherein providing the trigger input further comprises:
    determining, by the package launch controller based on the flight location system signal and a ground-based package target location, a corresponding time to provide the trigger input to the package launching device; and
    issuing, by the package launch controller, the trigger input to the package launching device at the corresponding time.

30. The method of operating the airframe package launching system of claim 23, wherein providing the trigger input further comprises:
    determining, by the package launch controller and a ground-based package target location, a corresponding time to provide the trigger input to the package launching device; and
    preventing, by the package launch controller, the trigger input to the package launching device at the corresponding time based on the launch assembly device status or position sensor signal.

31. The method of operating the airframe package launching system of claim 23, wherein providing the trigger input further comprises:
    determining, by the package launch controller and a ground-based package target location, a corresponding time to provide the trigger input to the package launching device; and
    preventing, by the package launch controller, the trigger input to the package launching device at the corresponding time based on the airframe door status or position sensor signal.

* * * * *